(12) United States Patent
Kumaki et al.

(10) Patent No.: US 7,636,107 B2
(45) Date of Patent: Dec. 22, 2009

(54) IMAGING DEVICE, SIGNAL PROCESSING METHOD, RECORDING MEDIUM, AND PROGRAM

(75) Inventors: Jinyo Kumaki, Tokyo (JP); Satoshi Takemoto, Tokyo (JP); Hidenori Kushida, Tokyo (JP)

(73) Assignee: Sony Corporation, Tokyo (JP)

( * ) Notice: Subject to any disclaimer, the term of this patent is extended or adjusted under 35 U.S.C. 154(b) by 621 days.

(21) Appl. No.: 10/516,270

(22) PCT Filed: May 28, 2003

(86) PCT No.: PCT/JP03/06633

§ 371 (c)(1),
(2), (4) Date: Nov. 29, 2004

(87) PCT Pub. No.: WO03/102661

PCT Pub. Date: Dec. 11, 2003

(65) Prior Publication Data

US 2005/0206738 A1 Sep. 22, 2005

(30) Foreign Application Priority Data

May 30, 2002 (JP) .............................. 2002-157027
May 31, 2002 (JP) .............................. 2002-159340

(51) Int. Cl.
H04N 5/228 (2006.01)

(52) U.S. Cl. ............................... 348/208.6; 348/208.99

(58) Field of Classification Search ... 348/208.1–208.6, 348/208.99, 208.13, 208.14, 208.12, 349, 348/353, 354

See application file for complete search history.

(56) References Cited

U.S. PATENT DOCUMENTS

| | | | |
|---|---|---|---|
| 5,192,964 A * | 3/1993 | Shinohara et al. | 396/55 |
| 5,210,563 A | 5/1993 | Hamada et al. | |
| 5,625,415 A * | 4/1997 | Ueno et al. | 348/350 |
| 5,805,937 A | 9/1998 | Kitagawa | |
| 6,369,899 B1 * | 4/2002 | Hamada | 356/603 |
| 6,738,197 B2 * | 5/2004 | Fujii | 359/698 |
| 2001/0050719 A1 | 12/2001 | Kobayashi et al. | |
| 2002/0027599 A1 | 3/2002 | Yamazaki | |

FOREIGN PATENT DOCUMENTS

| | | |
|---|---|---|
| JP | 2001-350170 | 12/2001 |
| JP | 2002-6359 | 1/2002 |
| JP | 2002-148670 | 5/2002 |

* cited by examiner

Primary Examiner—Luong T Nguyen
(74) Attorney, Agent, or Firm—Frommer Lawrence & Haug LLP; William S. Frommer; Thomas F. Presson

(57) ABSTRACT

An image-capturing apparatus, a method for processing signals, a recording medium, and a program that can improve the accuracy of an autofocus function with respect to a subject at the time of fill-light projection. A microcomputer monitors a fill-light controller and determines whether or not a fill-light projection flag is ON. If it is determined that the fill-light projection flag is ON, the microcomputer performs computation of the amount of control of image-blur correction to determine the amount of control of image-blur correction, and outputs the determined amount of control of image-blur correction to a detector. The detector determines the position of a detection frame for autofocus, changes the size or number of detection frames based on information on the zoom factor, and controls the position of the detection frame, and the size or number of detection frames.

9 Claims, 18 Drawing Sheets

IMAGING DEVICE, SIGNAL PROCESSING METHOD, RECORDING MEDIUM, AND PROGRAM

TECHNICAL FIELD

The present invention relates to image-capturing apparatuses, methods for processing signals, recording media, and programs. Specifically, the present invention relates to an image-capturing apparatus, a method for processing signals, a recording medium, and a program that can always improve the accuracy of autofocus.

BACKGROUND ART

In an image-capturing apparatus, such as a video recorder with a camera (hereinafter, referred to as camcorder) and a digital still camera, image blur is corrected, for example, by mechanically adjusting the optical system. Such a method is typified by an "antivibration lens-shifting method" where a shiftable lens is moved according to the amount of image blur, and a "vari-angle prism (VAP) method" where a vari-angle prism is tilted according to the amount of image blur.

In such a method for correcting image blur, image-blur signals in the image-capturing apparatus are detected, for example, by an angular-velocity sensor. Then, computations, such as integration, are performed on the detected signals to determine the target value for image-blur correction. Correction of the optical system is thus controlled such that image blur is corrected based on this target value.

On the other hand, image-capturing apparatuses incorporate an autofocus function to automatically focus on the subject to be captured. In the autofocus function, image contrast is detected based on the light from the subject. Optical lenses are then adjusted to maximize the contrast. In such an autofocus function, focus control is difficult to perform under low-light conditions or when the subject itself has a low contrast. Therefore, a fill-light projector, including a light, which is installed in the image-capturing apparatus projects a projection pattern onto the subject. The autofocus function performs control to maximize the contrast of the projection pattern projected onto the subject.

However, when the image-blur correcting function described above and the autofocus function at the time of fill-light projection are simultaneously used, the image-blur correcting function performs control to prevent image blur with respect to the subject, thereby causing image blur in the projection pattern, which is projected by the fill-light projector installed in the image-capturing apparatus, with respect to the optical system in the image-capturing apparatus. This image blur may cause the fill-light projection pattern to move into and out of a detection frame defining a contrast detection range for autofocus, or may cause the projection pattern to deviate from the detection frame.

Moreover, in an image-capturing apparatus having a zoom function, the distance between portions of the fill-light projection pattern is widened at high zoom factors and the projection pattern may be completely off the detection frame, even though the projection pattern falls within the detection frame at low zoom factors.

To prevent such cases, a step is provided, in the manufacturing process, for adjusting the fill-light emitting position such that the fill-light projection pattern falls within the detection frame at the highest zoom factor. However, when image blur is corrected by the image-blur correcting function, the fill-light projection pattern simultaneously swings and may be completely off the detection frame.

Possible measures include increasing the pattern density of the projection pattern, making the density of the projection pattern variable according to the zoom factor, and moving the projection pattern in the same direction as that of the image-blur correction. However, in the case where the fill-light projector includes a light source, such as laser light, having a high energy density that involves control of intensity and pattern density, increasing the pattern density of the projection pattern or making the density of the projection pattern variable according to the zoom factor is difficult because of safety concerns. In addition, the image-capturing apparatus has structural constraints in moving the projection pattern in the same direction as that of the image-blur correction and may require additional apparatuses.

A method for solving these problems is to stop the image-blur correcting function during the projection of fill light. A problem in this method is that no image-blur correction is performed during the projection of fill light. Moreover, stopping the image-blur correcting function is accompanied by noise or vibration in the image-capturing apparatus. Even though the image-blur correcting function is restarted after the completion of the fill-light projection such that the effect of the image-blur correction at the time of exposure of images can be obtained, there is a delay until the effect of the correction becomes evident. However, control for preventing such delay causes the occurrence of noise or vibration.

As described above, the accuracy of the autofocus function is degraded when the image-blur correcting function and the autofocus function at the time of fill-light projection are simultaneously used.

Moreover, since autofocus does not effectively work, at the time of fill-light projection, when fill light is projected onto a subject that is not suitable for the fill light (that is, for example, a subject absorbing the fill light, allowing the fill light to pass through, or placed in an area, such as the end of the screen, where no fill light reaches), the autofocus may be performed based on information on images obtained by light other than the projection pattern. If the image-blur correcting function is stopped in this case, the accuracy of the autofocus function performed based on information on images obtained by light other than the projecting pattern, through the effective use of the image-blur correcting function, and the accuracy of other functions, such as exposure control and color control, are degraded.

DISCLOSURE OF INVENTION

The present invention was made in view of the circumstances described above, and aims to always improve the accuracy of the autofocus function.

An image-capturing apparatus of the present invention includes first determining means determining whether or not a projection pattern is projected by projecting means; computing means computing, based on a coefficient corresponding to the amplitude of signals detected by sensing means, the amount of image-blur correction control corresponding to the signals if the first determining means determines that the projection pattern is projected; frame-setting means setting, based on the amount of control computed by the computing means, the position of a detection frame within which the projection pattern is detected by detecting means; and correction-control means controlling, based on the amount of control computed by the computing means, image-blur correction performed by correcting means.

The image-capturing apparatus of the present invention may further include changing means changing the size of the detection frame or number of detection frames based on information on the zoom factor, as soon as the position of the detection frame is set by the frame-setting means.

The image-capturing apparatus of the present invention may further include reference-value setting means setting a reference value; second determining means determining, if the first determining means determines that the projection pattern is projected, whether or not the frequency of the signals detected by the sensing means is lower than the reference value set by the reference-value setting means; and prohibiting means prohibiting the image-blur correction by the correcting means if the second determining means determines that the frequency of the signals is lower than the reference value.

The computing means may compute, if the second determining means determines that the frequency of the signals is higher than the reference value, the amount of image-blur correction control corresponding to the signals, based on a coefficient corresponding to the amplitude of the signals.

The computing means may compute, if the second determining means determines that the frequency of the signals is higher than the reference value, the amount of image-blur correction control corresponding to the signals, while bringing the coefficient close to 1.

The image-capturing apparatus of the present invention may further include dividing means dividing, when the first determining means determines that the projection pattern is projected, the signals into a plurality of frequency bands, based on the frequency of the signals detected by the sensing means; and frequency-specific computing means computing the amount of image-blur correction control corresponding to the signals divided into the plurality of frequency bands by the dividing means, for each of the frequency bands, based on the coefficient corresponding to the amplitude of the signals. The correction-control means may control, based on the amount of control computed by the frequency-specific computing means, the image-blur correction performed by the correcting means.

The dividing means may divide the signals into three frequency bands. The frequency-specific computing means may compute the amount of image-blur correction control corresponding to the signals, which are divided by the dividing means, in the lowest frequency band, while bringing the coefficient close to 0; compute the amount of image-blur correction control corresponding to the signals, which are divided by the dividing means, in the middle frequency band, based on the coefficient corresponding to the amplitude of the signals; and compute the amount of image-blur correction control corresponding to the signals, which are divided by the dividing means, in the highest frequency band, while bringing the coefficient close to 1.

A method for processing signals according to the present invention includes a determining step for determining whether or not a projection pattern is projected by projecting means; a computing step for computing, based on a coefficient corresponding to the amplitude of signals detected by sensing means, the amount of image-blur correction control corresponding to the signals, if it is determined in the determining step that the projection pattern is projected; a frame-setting step for setting, based on the amount of control computed in the computing step, the position of a detection frame within which the projection pattern is detected by detecting means; and a correction-control step for controlling, based on the amount of control computed in the computing step, image-blur correction performed by correcting means.

A program in a recording medium according to the present invention includes a determining step for determining whether or not a projection pattern is projected by projecting means; a computing step for computing, based on a coefficient corresponding to the amplitude of signals detected by sensing means, the amount of image-blur correction control corresponding to the signals, if it is determined in the determining step that the projection pattern is projected; a frame-setting step for setting, based on the amount of control computed in the computing step, the position of a detection frame within which the projection pattern is detected by detecting means; and a correction-control step for controlling, based on the amount of control computed in the computing step, image-blur correction performed by correcting means.

A program according to the present invention includes a determining step for determining whether or not a projection pattern is projected by projecting means; a computing step for computing, based on a coefficient corresponding to the amplitude of signals detected by sensing means, the amount of image-blur correction control corresponding to the signals, if it is determined in the determining step that the projection pattern is projected; a frame-setting step for setting, based on the amount of control computed in the computing step, the position of a detection frame within which the projection pattern is detected by detecting means; and a correction-control step for controlling, based on the amount of control computed in the computing step, image-blur correction performed by correcting means.

According to the present invention, if it is determined that a projection pattern is projected, the amount of image-blur correction control corresponding to signals is computed, based on based on a coefficient corresponding to the amplitude of the detected signals. Then, the position of a detection frame within which the projection pattern is detected is set, based on the determined amount of control, and image-blur correction is controlled, based on the determined amount of control.

BEST MODE FOR CARRYING OUT THE INVENTION

Figure 1:
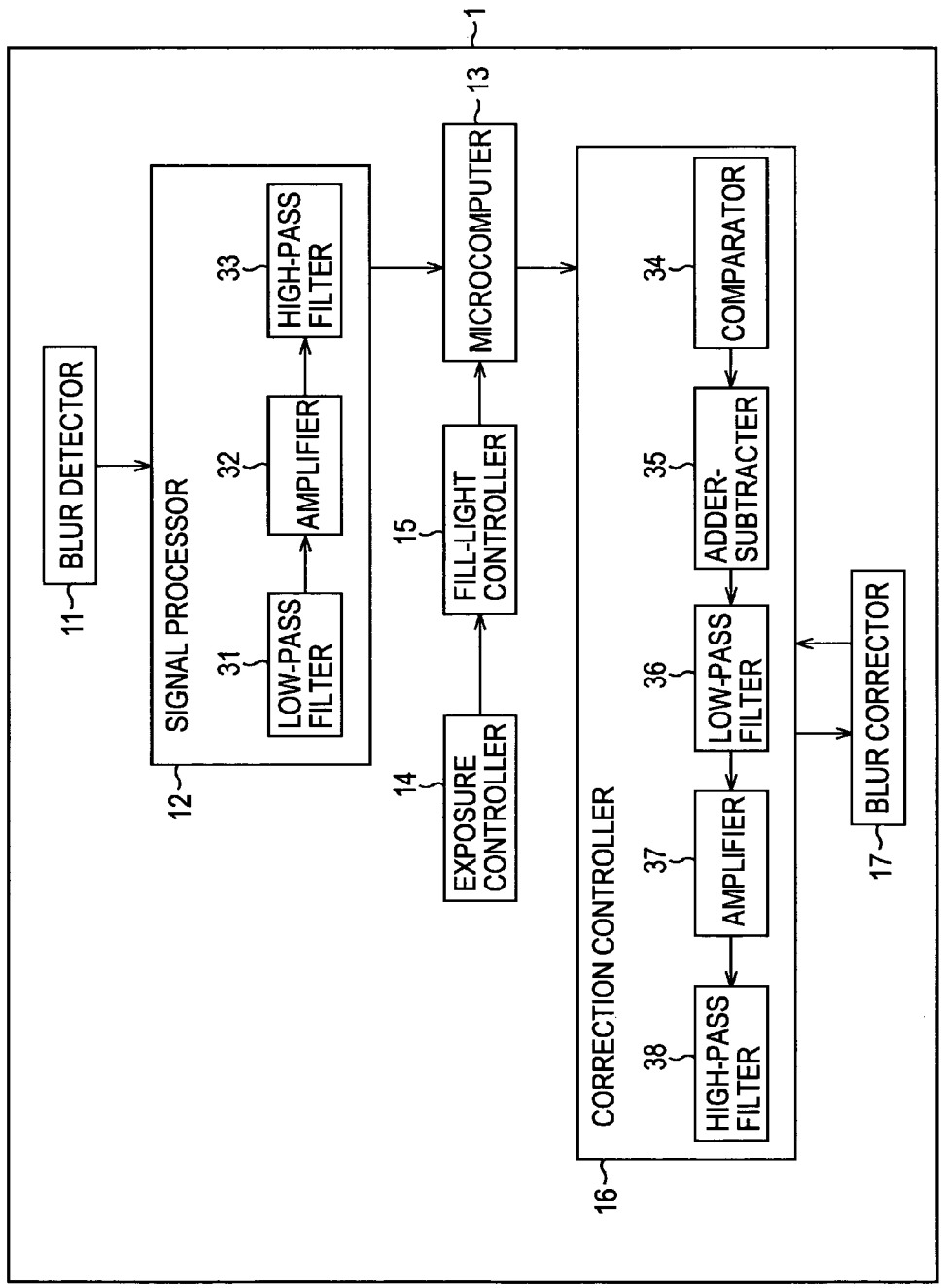
FIG. 1 is a block diagram showing an example of the structure of an image-capturing apparatus to which the present invention is applied.

FIG. 1 is a block diagram showing an example of the structure of an image-capturing apparatus 1, which is typified by a video recorder with a camera (hereinafter, referred to as camcorder), to which the present invention is applied. Referring to FIG. 1, the image-capturing apparatus 1 includes a blur detector 11, a signal processor 12, a microcomputer 13, an exposure controller 14, a fill-light controller 15, a correction controller 16, and a blur corrector 17.

The blur detector 11 includes, for example, an angular-velocity sensor, which vibrates together with an optical system (not shown) and is installed in the image-capturing apparatus 1, and detects image blur.

The signal processor 12 receives image-blur signals, which are angular-velocity signals detected by the blur detector 11, and converts the image-blur signals into signals matching the interface of the microcomputer 13. The signal processor 12 is an analog circuit including a low-pass filter 31 blocking frequencies higher than a predetermined cutoff frequency, an amplifier 32 amplifying image-blur signals, and a high-pass filter 33 blocking frequencies lower than a predetermined cutoff frequency.

The exposure controller 14 measures the amount of light from a subject, adjusts the aperture and shutter speed, and controls the exposure and so on. The fill-light controller 15 turns ON/OFF a fill-light projection flag based on the information on the amount of light measured by the exposure controller 14, controls a fill-light projector (not shown) including a light, and projects a fill-light projection pattern.

Based on the fill-light projection flag in the fill-light controller 15, the microcomputer 13 performs predetermined adjustment processing on the image-blur signals from the signal processor 12 and determines the amount of control of image-blur correction corresponding to the image-blur signals and required to correct image blur.

The correction controller 16, based on the amount of control of image-blur correction determined by the microcomputer 13, controls the blur corrector 17 including a motor to be positioned at a target position. The correction controller 16 includes a comparator 34 comparing image-blur signals to the amount of control of image-blur correction, an adder-subtracter 35 performing addition and subtraction of control signals and the like, a low-pass filter 36 blocking frequencies higher than a predetermined cutoff frequency, an amplifier 37 amplifying signals, and a high-pass filter 38 blocking frequencies lower than a predetermined cutoff frequency.

Although the image-capturing apparatus 1 has the structure for capturing images and the various structures for recording and playing back captured video signals, they are omitted from the example in FIG. 1 for convenience of description.

Figure 2:
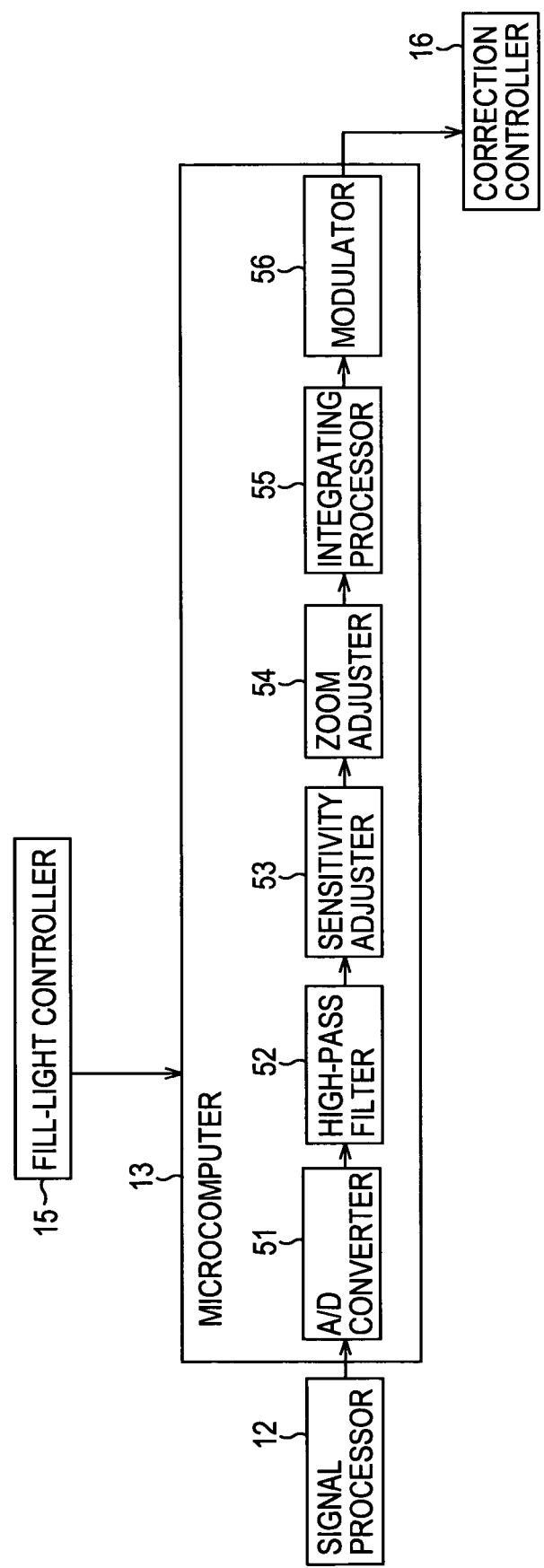
FIG. 2 is a block diagram showing an example of the structure of a microcomputer in FIG. 1.

FIG. 2 is a block diagram showing an example of the detailed structure of the microcomputer 13.

The microcomputer 13 includes an analog-to-digital (A/D) converter 51, a high-pass filter 52, a sensitivity adjuster 53, a zoom adjuster 54, an integrating processor 55, and a modulator 56, and controls the entire operation of the image-capturing apparatus 1. Moreover, the microcomputer 13 sets a frequency higher than a predetermined cutoff frequency for the high-pass filter 52 as a reference value $\alpha$.

The A/D converter 51 converts the image-blur signals, which are analog signals, supplied from the signal processor 12 into digital signals and outputs them to the high-pass filter 52. The high-pass filter 52 not only blocks frequencies lower than a predetermined cutoff frequency, but also, under the control of the microcomputer 13 monitoring a fill-light projection flag of the fill-light controller 15, blocks frequencies lower than the reference value $\alpha$ set as a frequency higher than a predetermined cutoff frequency, in order that no image-blur correction to image-blur signals at such blocked frequencies is performed.

To compensate for variation in sensitivity of the angular-velocity sensor included in the blur detector 11, the sensitivity adjuster 53 performs gain adjustment of the image-blur signals from the high-pass filter 52, according to the sensitivity of the angular-velocity sensor. Then, the zoom adjuster 54 performs gain adjustment of the image-blur signals, according to the zoom position.

The integrating processor 55 integrates the image-blur signals after the sensitivity adjustment and the gain adjustment and determines the amount of image-blur correction control corresponding to the image-blur signals and required for correcting image blur. The modulator 56 converts the determined amount of control into pulse width modulation (PWM) signals and outputs them to the correction controller 16.

Figure 3:
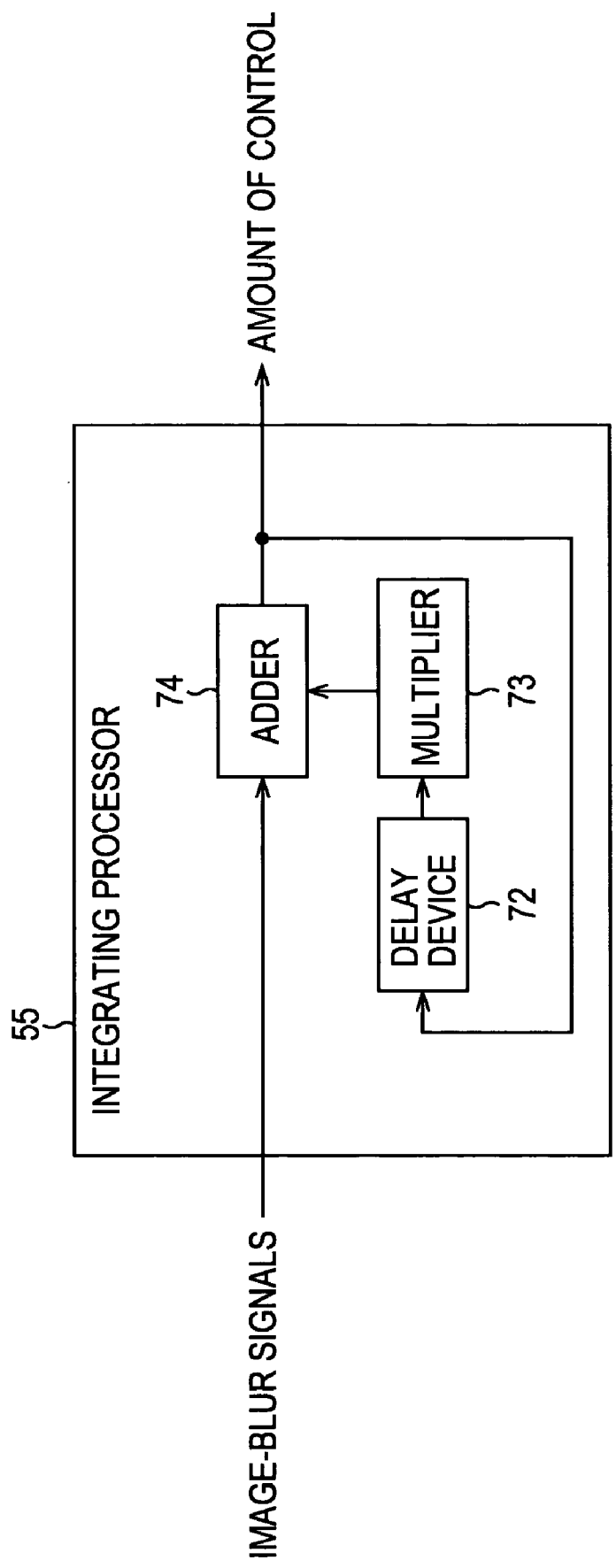
FIG. 3 is a block diagram showing an example of the detailed structure of an integrating processor in FIG. 2.

FIG. 3 is a block diagram showing an example of the detailed structure of the integrating processor 55. In the example shown in FIG. 3, the integrating processor 55 includes a delay device 72, a multiplier 73, and an adder 74.

The integrating processor 55 integrates the image-blur signals inputted from the zoom adjuster 54 and outputs a feedback amplitude A, which is the result of the integration, to the delay device 72. The delay device 72 delays the feedback amplitude A by one sampling period. The multiplier 73 multiplies the feedback amplitude A, which is delayed by one sampling period by the delay device 72, by a feedback coefficient K that can be determined based on a coefficient table such as that shown in FIG. 4.

This feedback coefficient K is a value ranging from 0 to 1. As this feedback coefficient K approaches 1, the effect of image-blur correction increases (or is intensified). However, a limit of this correction is reached, due to constrains of valid pixels, optical constraints, or structural (mechanical) constraints, and unnatural movements of corrected images may occur. Therefore, a feedback coefficient K corresponding to a feedback amplitude A is determined based on a coefficient table as that shown in FIG. 4.

Figure 4:
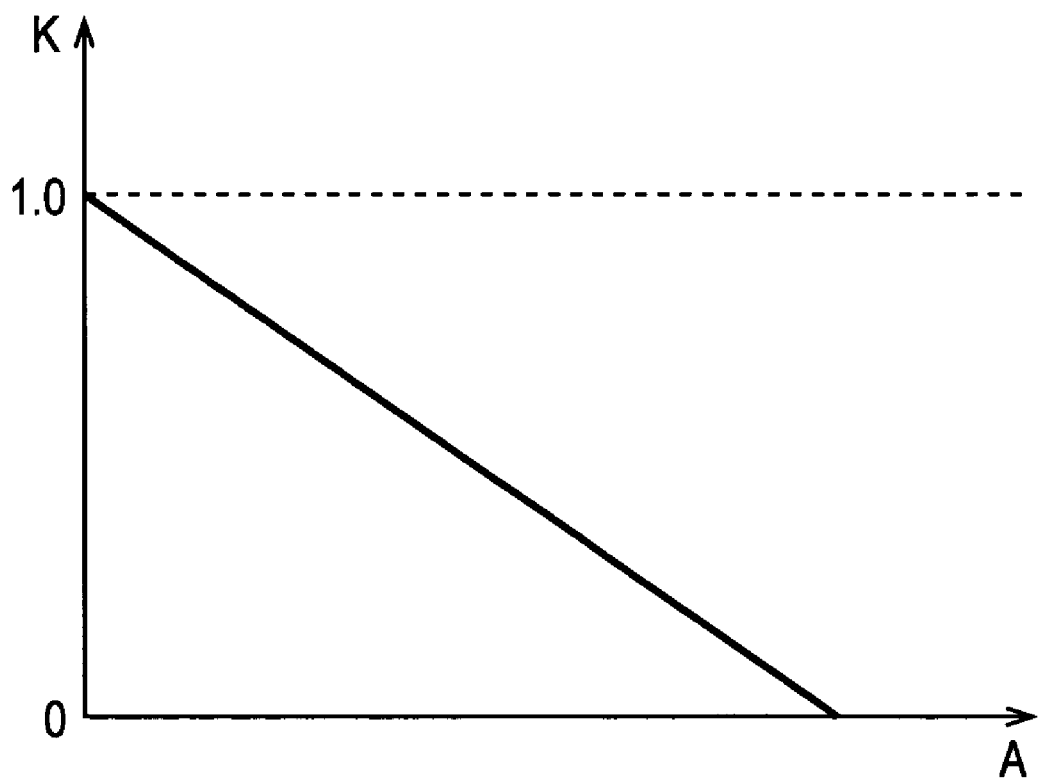
FIG. 4 is a diagram showing a coefficient table.

In the example shown in FIG. 4, the horizontal axis indicates values of the feedback amplitude A, which become higher toward the right. The vertical axis indicates values of the feedback coefficient K ranging from 0 to 1. That is, this example of a coefficient table shows that the feedback coefficient K approaches 1 as the feedback amplitude A decreases, while the feedback coefficient K approaches 0 as the feedback amplitude A increases.

Since the feedback coefficient K corresponding to the feedback amplitude A can be determined as described above, the effect of image-blur correction increases as the feedback amplitude A decrease, while the effect of image-blur correction decreases as the feedback amplitude A increases. Thus, unnatural movements of corrected images can be avoided.

The multiplier 73 multiplies the feedback amplitude A by the feedback coefficient K determined as described above.

Then the adder 74 adds this multiplied value to the next image-blur signals to determine the amount of control of image-blur correction for image-blur signals, and outputs the amount of control to the modulator 56. In other words, the adder 74 adds a value determined by multiplying an integrated output (feedback amplitude A) in the previous sampling period by the feedback coefficient K, to the current image-blur signals. This processing repeats as long as image-blur correction continues.

Figure 5:
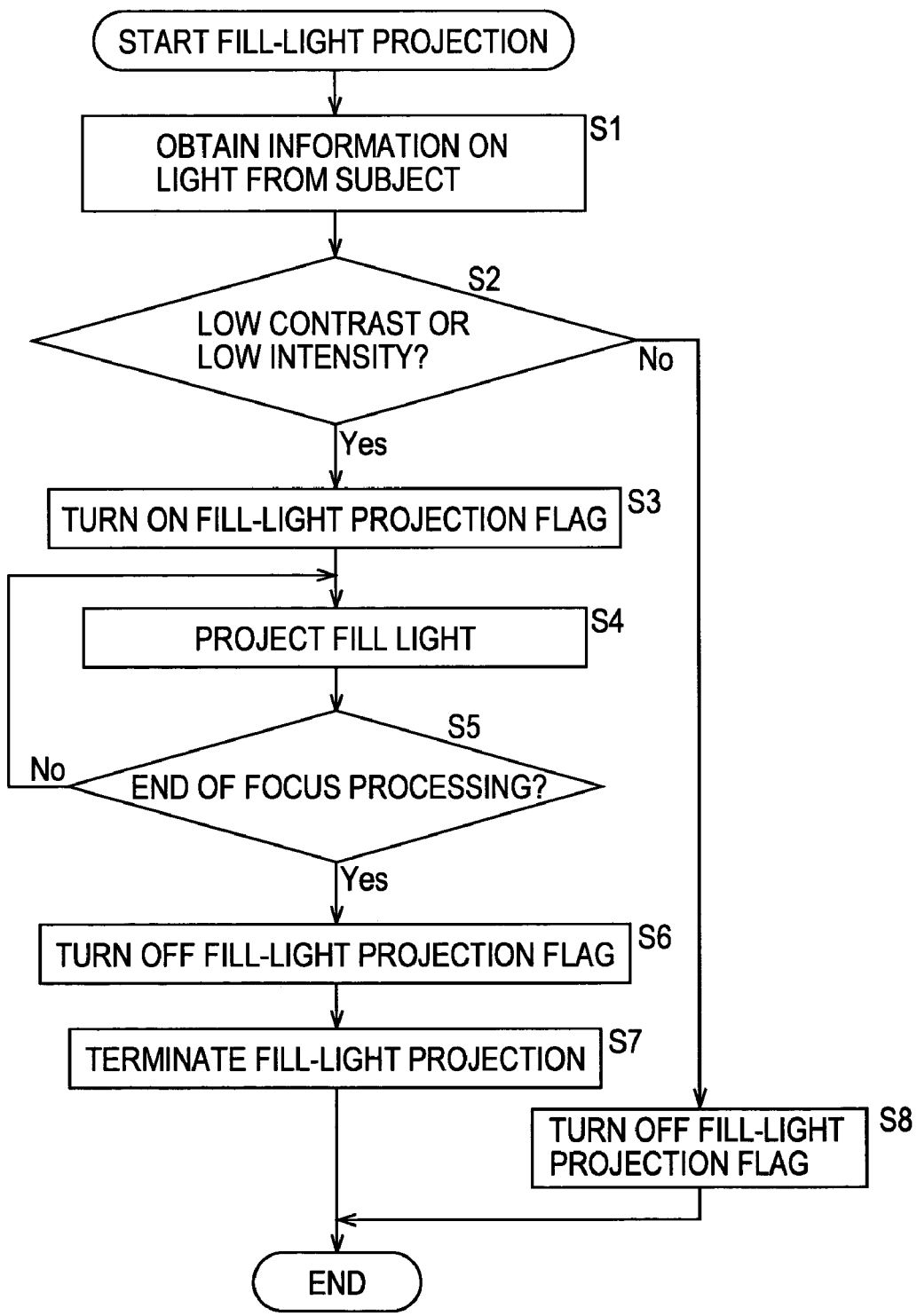
FIG. 5 is a flowchart showing fill-light projection processing in the image-capturing apparatus in FIG. 1.

Processing of fill-light projection in autofocus will now be described with reference to the flowchart in FIG. 5.

After the power is turned on, the processing of fill-light projection is performed in the image-capturing apparatus 1. In step S1, the fill-light controller 15 obtains measured information on light from a subject, from the exposure controller 14.

In step S2, the fill-light controller 15 determines, based on the information on light from the subject, whether or not the light is low contrast or low intensity. If it is determined that the light is low contrast or low intensity, the fill-light controller 15 turns ON the fill-light projection flag in step S3.

In step S4, the fill-light controller 15 controls the fill-light projector (not shown) including the light to project a fill-light projection pattern. Thus, autofocus processing at the time of fill-light projection is performed in the image-capturing apparatus 1. This autofocus processing is performed by detecting the contrast of an image based on light from the subject, and by correcting an optical lens to maximize the contrast. The projection of the fill-light projection pattern repeats until the fill-light controller 15 determines, in step S5, that the autofocus processing in the image-capturing apparatus 1 is completed.

If it is determined in step S5 that the autofocus processing in the image-capturing apparatus 1 has been completed, the fill-light controller 15 turns OFF the fill-light projection flag in step S6 and terminates the projection of the fill-light projection pattern in step S7.

In step S2, if it is not determined that the light is low contrast and low intensity, the fill-light controller 15 turns OFF the fill-light projection flag and terminates the processing in step S8.

The microcomputer 13 can determine, by monitoring the ON/OFF state of the fill-light projection flag in the fill-light controller 15, whether or not the fill-light projection pattern is projected in image-blur correction processing described below.

Figure 6:
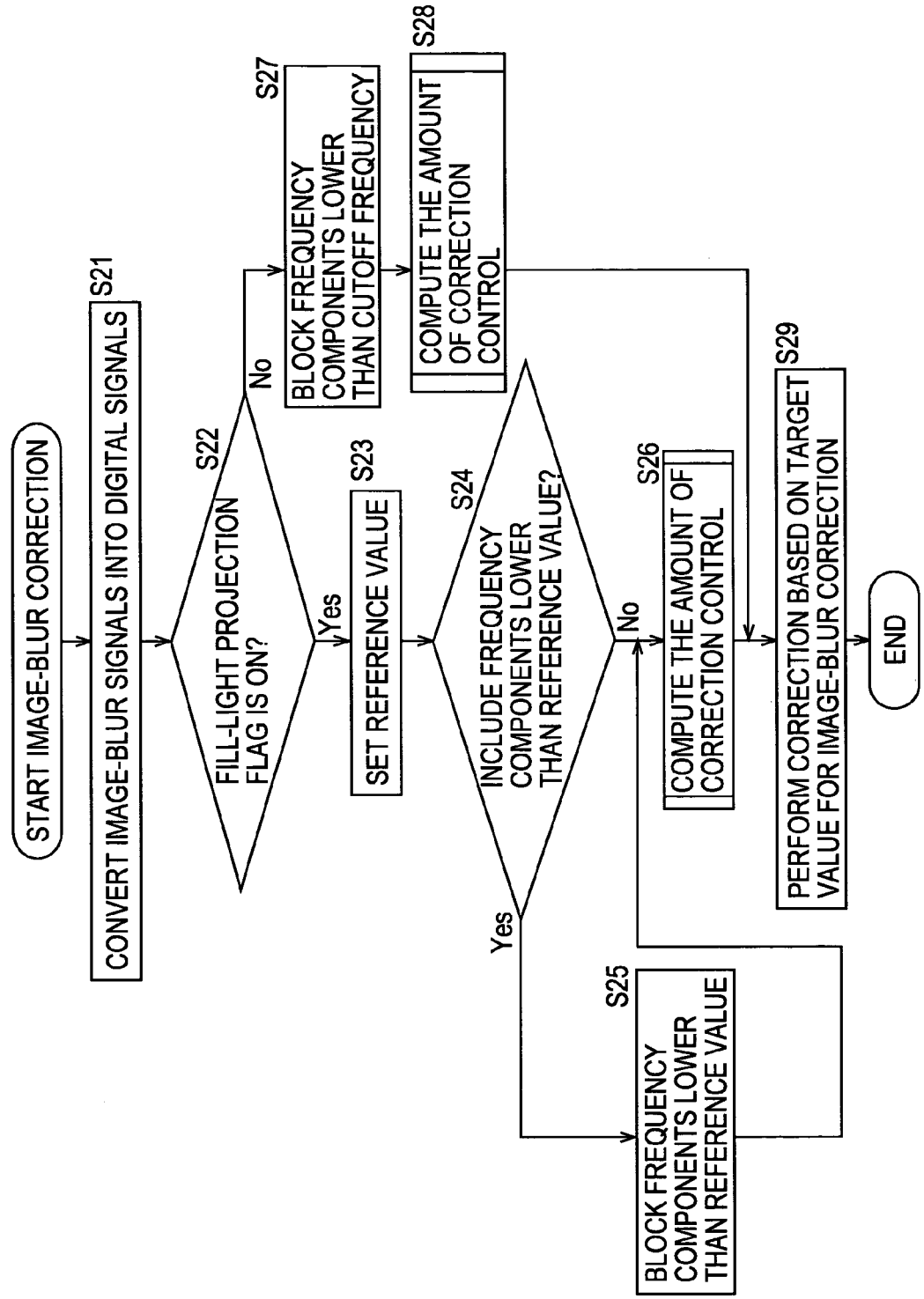
FIG. 6 is a flowchart showing image-blur correction processing in the image-capturing apparatus in FIG. 1.

The image-blur correction processing will now be described with reference to the flowchart in FIG. 6.

In step S21, the A/D converter 51 converts the image-blur signals, which are analog signals, into digital signals.

In step S22, the microcomputer 13 monitors the fill-light controller 15 and determines whether or not the fill-light projection flag is ON. If it is determined that the fill-light projection flag is ON, the microcomputer 13 sets a reference value $\alpha$ for frequencies in step S23. The reference value $\alpha$ is set higher than a cutoff frequency predetermined for the high-pass filter 52 to block low frequencies, in order that no image-blur correction to image blur at low frequencies, which is a major cause of the movement of the projection pattern into and out of a detection frame defining a contrast detection range for the autofocus function, is performed.

In step S24, the microcomputer 13 determines whether or not the image-blur signals include frequency components lower than the reference value $\alpha$ set in step S23. If it is determined in step S24 that the image-blur signals include frequency components lower than the reference value $\alpha$, the high-pass filter 52 blocks the frequency components lower than the reference value $\alpha$ of the image-blur signals, in step S25. This prohibits the image-blur correction to image-blur signals at frequencies lower than the reference value $\alpha$.

Figure 7:
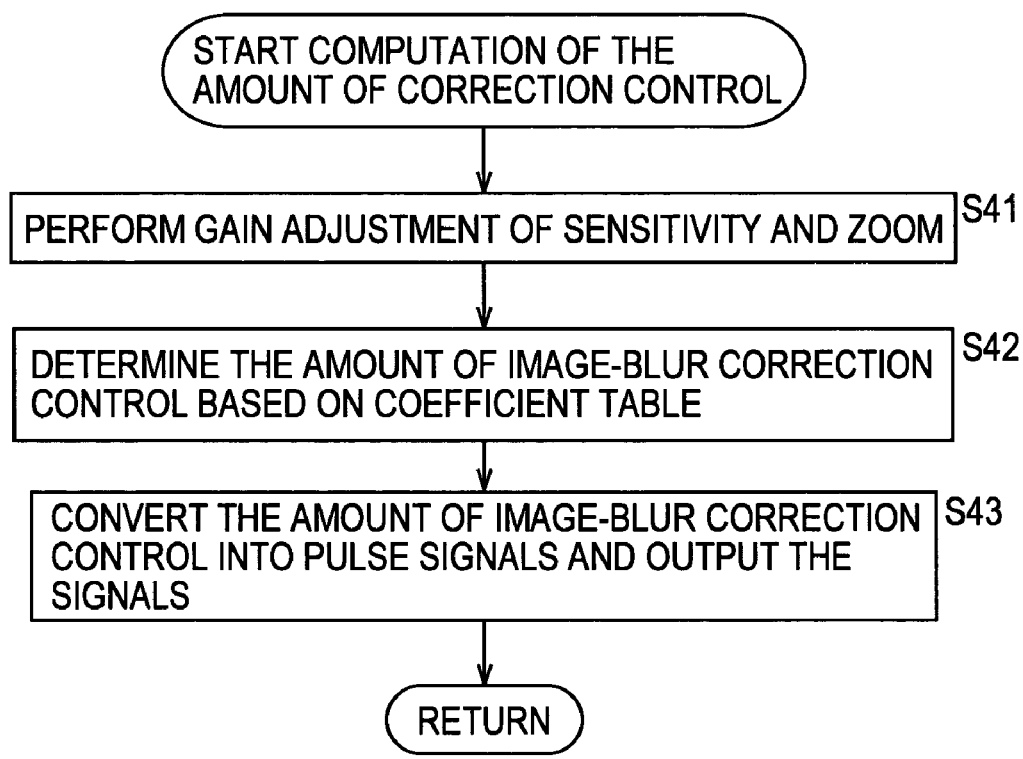
FIG. 7 is a flowchart showing computations of the amount of correction control in step S26 in FIG. 6.

If it is determined in step S24 that the image-blur signals include no frequency component lower than the reference value $\alpha$, the microcomputer 13 skips processing in step S25 and performs computations of the amount of correction control, in step S26. That is, in step S26, only a computation of the amount of control of the image-blur correction to image-blur signals at frequencies higher than the reference value $\alpha$ is performed. This computation of the amount of correction control will now be described with reference to the flowchart in FIG. 7.

In step S41, the sensitivity adjuster 53 performs gain adjustment of the image-blur signals according to the angular-velocity sensor included in the blur detector 11, while the zoom adjuster 54 performs gain adjustment of the image-blur signals according to the zoom position.

In step S42, the integrating processor 55 adds the sum of a value (feedback amplitude A) determined by integrating image-blur signals in the previous sampling period and a feedback coefficient K determined from the coefficient table (see FIG. 4) to the adjusted image-blur signals, thereby determining the amount of control of the image-blur correction required for correcting image blur.

In step S43, the modulator 56 converts the amount of control of the image-blur correction into pulse width modulation (PWM) signals and outputs them to the correction controller 16.

On the other hand, if it is determined in step S22 that the fill-light projection flag is OFF, the high-pass filter 52 blocks, in step S27, image-blur signals at frequencies lower than a predetermined cutoff frequency. Therefore, in this case, processing subsequent to step S28 is also performed with respect to frequency components lower than a reference value $\alpha$ and higher than a cutoff frequency.

In step S28, the microcomputer 13 performs a normal computation of the amount of correction control. This computation of the amount of correction control is basically the same as that described above with reference to FIG. 7. While the description will be omitted to avoid repetition, this processing determines the amount of control of the image-blur correction required for correcting image blur.

After the amount of control of the image-blur correction required for correcting image blur is determined in the processing in step S26 or S28, the correction controller 16 controls, in step S29, the correction of the blur corrector 17, based on the determined amount of control of the image-blur correction, such that the blur corrector 17 is positioned at a target position.

In general, image-blur at high frequencies is small in amplitude and is unlikely to easily reach a limit that causes unnatural movements of corrected images (as described above, with reference to FIG. 4). Therefore, the feedback coefficient K may be brought close to 1 in performing computations of the amount of correction control in step S26 in FIG. 6. Thus, intensive correction only to image blur at high frequencies can be performed at the time of fill-light projection.

Thus, the accuracy of the autofocus function is improved since, as described above, correction to image blur at low frequencies, which is a major cause of the movement of the projection pattern into and out of the detection frame defining a contrast detection range for the autofocus function, is prohibited. Moreover, the fill-light projection pattern can fall within the detection frame, which is the contrast detection range, regardless of the zoom factor.

Furthermore, since the image-blur correction with respect to high frequencies is performed at the time of fill-light projection, normal autofocus of a subject with light other than the fill-light projection pattern can be performed. The autofocus function can also be effectively performed on a subject unsuitable for the fill light (that is, for example, a subject absorbing the fill light, allowing the fill light to pass through, or placed in an area, such as the end of the screen, where no fill light reaches). Other controls, such as exposure control and color control, are also effectively performed.

Moreover, since no abrupt change of image-blur correction, such as stopping of the image-blur correcting function, is made at the time of fill-light projection, the occurrence of noise, vibration, or an abrupt change of the screen can be prevented. Furthermore, since the image-blur correcting function always operates, a delay in image-blur correction can be prevented. In addition, power saving can be achieved since the image-blur correction at the time of fill-light projection is performed with respect to high frequencies only. Moreover, cost reduction can be achieved since the existing image-capturing apparatus requires no additional apparatuses to realize the above-described effects.

Furthermore, in an image-capturing apparatus with a fill-light projector incorporating a light source having a high energy density, such as laser light, the applicability of the apparatus is improved since no change that involves risk, such as a change in projection pattern, is required in the case of replacing the existing lens with a lens having a different zoom factor.

Although the angular-velocity sensor and angular-velocity signals have been used to describe the blur detector 11 and image-blur signals, respectively, other angular sensors, angular-velocity sensors, or velocity sensors may also be employed. Moreover, although the antivibration shiftable lens is used to describe the blur corrector 17, a vari-angle prism (VAP) or the like may also be employed.

In the above description, a high reference value serving as a cutoff frequency is set in the high-pass filter 52 within the microcomputer 13. However, for example, a high reference value serving as a cutoff frequency may be set in the high-pass filter 33 within the signal processor 12 in FIG. 1, or in the high-pass filter 38 within the correction controller 16. Furthermore, frequency characteristics of the angular-velocity sensor included in the blur detector 11 may be changed. Even if, as described above, frequency characteristics are controlled outside the microcomputer 13, image-blur correction processing of image-blur signals are performed according to the control of the microcomputer 13.

Figure 8:
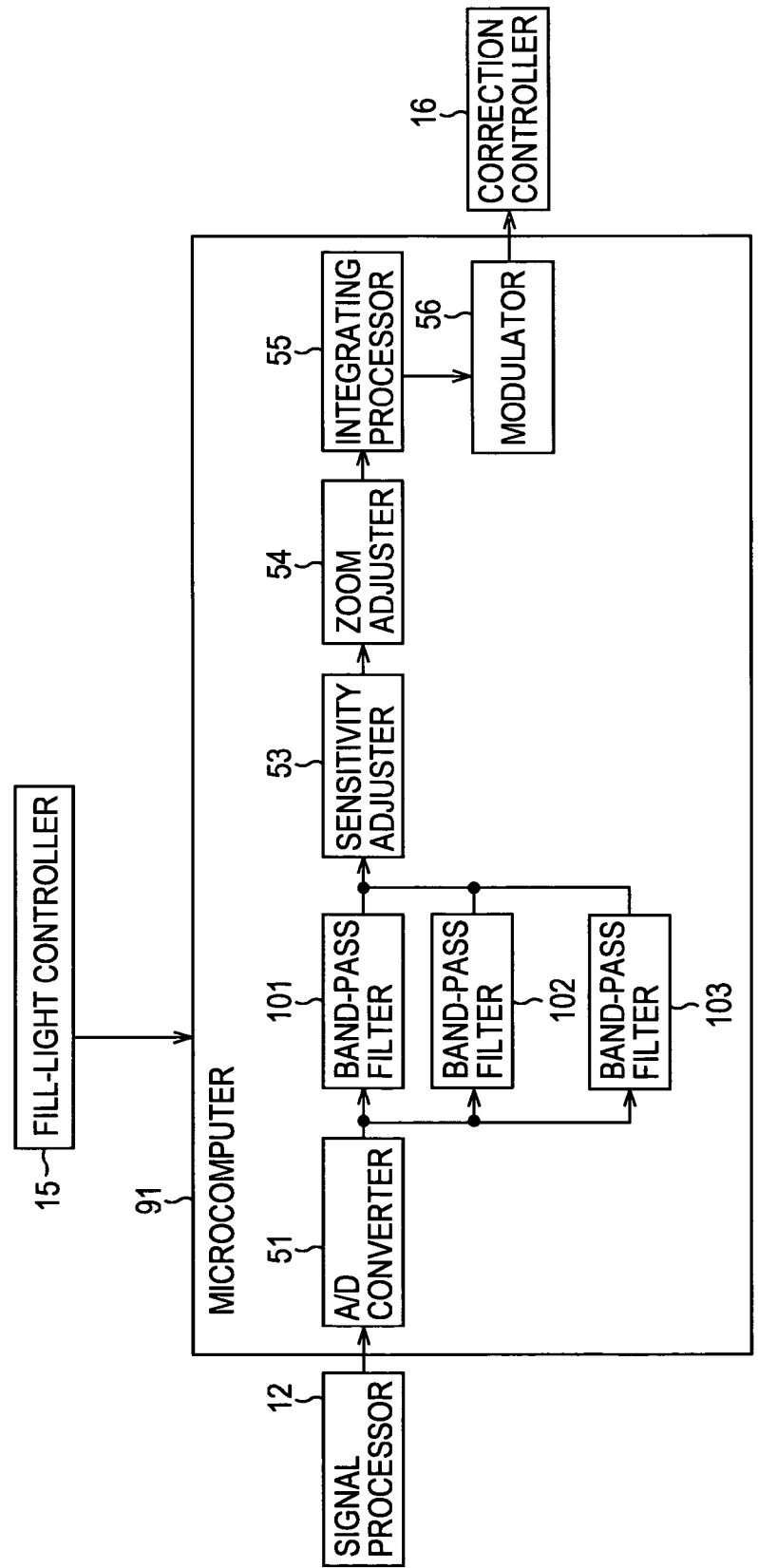
FIG. 8 is a block diagram showing another example of the structure of the microcomputer in FIG. 1.

FIG. 8 is a block diagram showing another example of the structure of a microcomputer. A microcomputer 91 in FIG. 8 has the same structure as that of the microcomputer 13 in FIG. 2 except that the high-pass filter 52 is replaced with band-pass filters 101 to 103. Components corresponding to those in FIG. 2 are indicated by the same reference numerals and the description will be omitted to avoid repetition.

The band-pass filters 101 to 103 subsequent to the A/D converter 51 are arranged in parallel, allow image-blur signals at respective frequency bands, which are outputted from the A/D converter 51, to pass through, and output them to the sensitivity adjuster 53. While these frequency bands are predetermined, as shown in FIG. 9, they may be controlled by the microcomputer 91.

Figure 9:
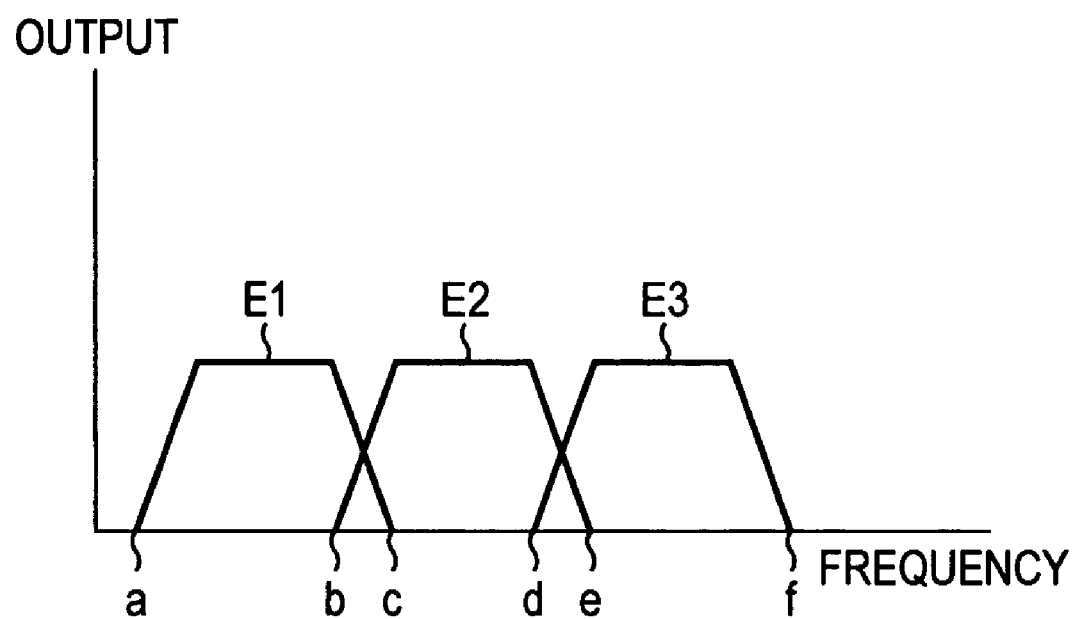
FIG. 9 is a diagram showing frequency bands of band-pass filters in FIG. 8.

FIG. 9 is a diagram showing frequency bands corresponding to the respective band-pass filters 101 to 103. In FIG. 9, the horizontal axis indicates frequencies which become higher toward the right. The vertical axis indicates the ratio of signals outputted from each of the band-pass filters 101 to 103.

In the case of the example shown in FIG. 9, the lowest frequency band E1 ranging from a frequency a to a frequency c (the frequency band that includes the lowest frequencies in frequency bands E1 to E3) is the frequency band that can be passed by the band-pass filter 101, the middle frequency band E2 ranging from a frequency b to a frequency d (the frequency band that includes the middle frequencies in frequency bands E1 to E3) is the frequency band that can be passed by the band-pass filter 102, and the highest frequency band E2 ranging from a frequency d to a frequency f (the frequency band that includes the highest frequencies in frequency bands E1 to E3) is the frequency band that can be passed by the band-pass filter 103 ($0<a<b<c<d<e<f$).

Although the frequency band ranging from the frequency b to the frequency c overlaps with the frequency band E1 and the frequency band E2, this poses no problem since the frequency band ranging from the frequency b to the frequency c is narrow. Similarly, although the frequency band ranging from the frequency d to the frequency e overlaps with the frequency band E2 and the frequency band E3, this poses no problem since the frequency band ranging from the frequency d to the frequency e is narrow.

The microcomputer 91 controls the integrating processor 55 to determine the amount of control of image-blur correction based on signals in the lowest frequency band E1 that are passed through the band-pass filter 101, signals in the middle frequency band E2 that are passed through the band-pass filter 102, and signals in the highest frequency band E3 that are passed through the band-pass filter 103.

Figure 10:
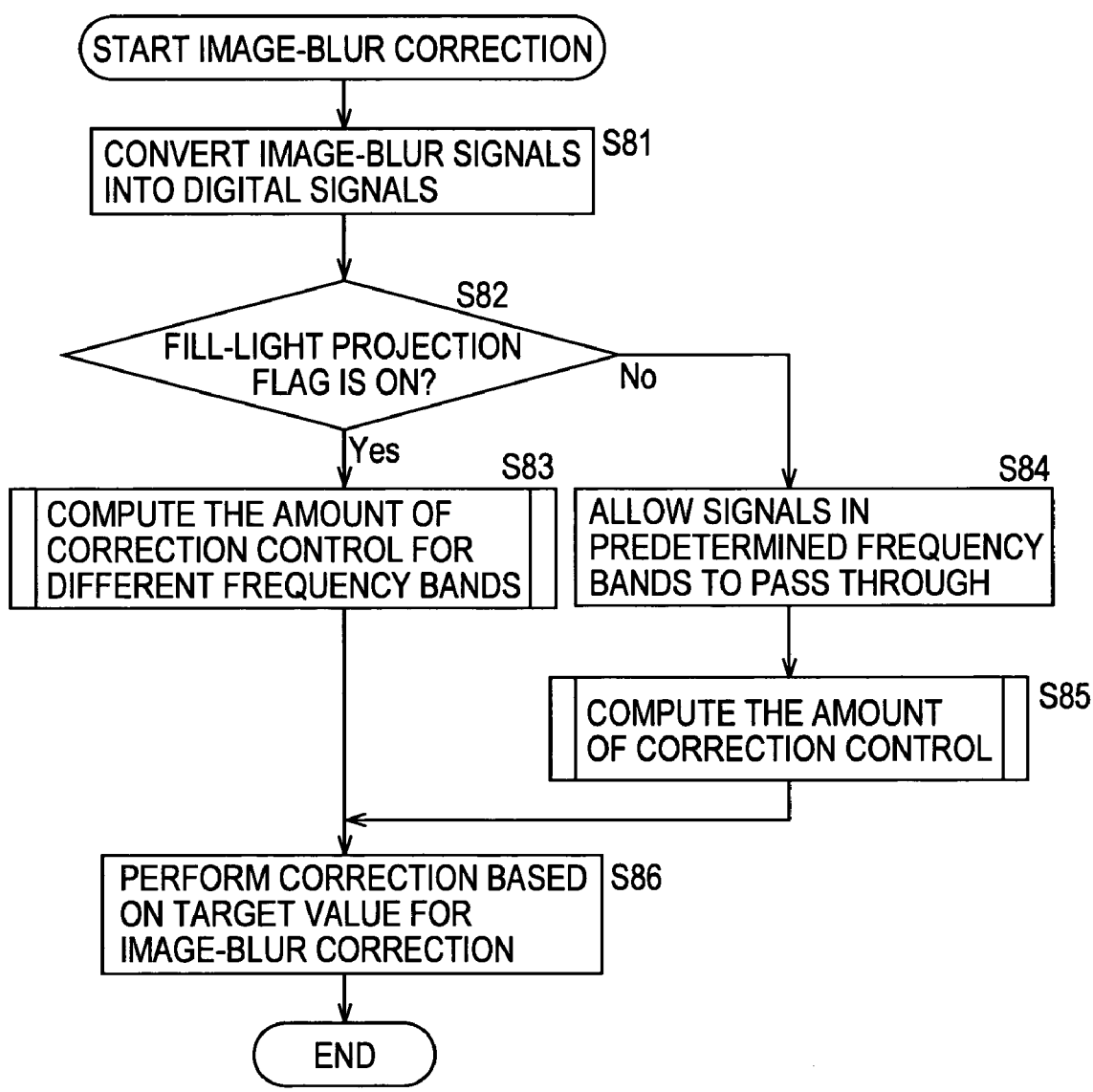
FIG. 10 is a flowchart showing another example of image-blur correction processing in the image-capturing apparatus in FIG. 1.

Another example of image-blur correction processing will now be described with reference to the flowchart in FIG. 10.

In step S81, the A/D converter 51 converts the image-blur signals, which are analog signals, into digital signals.

Figure 11:
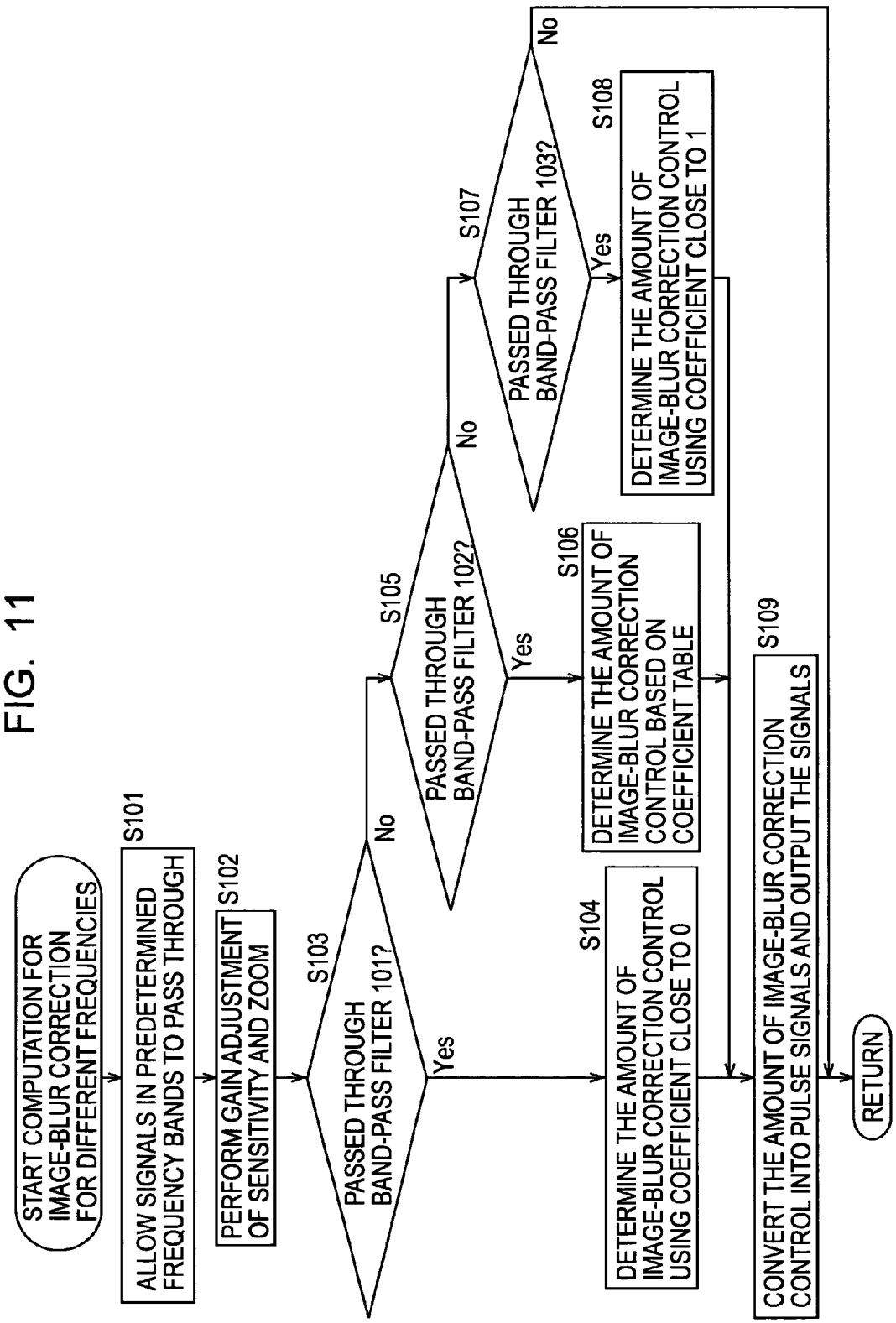
FIG. 11 is a flowchart showing computations of the amount of correction control for respective frequency bands in step S83 in FIG. 10.

In step S82, the microcomputer 91 monitors the fill-light controller 15 and determines whether or not the fill-light projection flag is ON. If it is determined that the fill-light projection flag is ON, the microcomputer 91 performs computations of the amount of correction control for the respective frequency bands in step S83. The computations of the amount of correction control for the respective frequency bands will now be described with reference to the flowchart in FIG. 11.

In step S101, as described with reference to FIG. 9, the band-pass filters 101 to 103 pass signals in the respective frequency bands and block signals at other frequencies. Here, the band-pass filter 101 passes signals in the lowest frequency band E1, the band-pass filter 102 passes signals in the middle frequency band E2, and the band-pass filter 103 passes signals in the highest frequency band E3.

In step S102, the sensitivity adjuster 53 performs gain adjustment of the image-blur signals passed in step S101 according to the angular-velocity sensor included in the blur detector 11, while the zoom adjuster 54 performs gain adjustment of the image-blur signals according to the zoom position.

In step S103, the microcomputer 91 determines whether or not the frequencies of the image-blur signals have been passed through the band-pass filter 101. That is, it is determined whether or not the frequencies of the image-blur signals fall within the frequency band (the lowest frequency band E1 ranging from the frequency a to the frequency c) that can be passed by the band-pass filter 101.

If it is determined, in step S103, that the frequencies of the image-blur signals have been passed through the band-pass filter 101, the integrating processor 55 adds, in step S104, the sum of a value (feedback amplitude A) determined by integrating image-blur signals in the previous sampling period and a feedback coefficient K close to 0 to the adjusted image-blur signals, thereby determining the amount of control of the image-blur correction required for correcting image-blur. Thus, the image-blur correction is controlled, in the subsequent processing, such that the effect of image-blur correction with respect to signals at frequencies within the lowest frequency band E1 can be weakened.

If it is not determined, in step S103, that the frequencies of the image-blur signals have been passed through the band-pass filter 101, the microcomputer 91 determines, in step S105, whether or not the frequencies of the image-blur signals have been passed through the band-pass filter 102. That is, it is determined whether or not the frequencies of the image-blur signals fall within the frequency band (the middle frequency band E2 ranging from the frequency b to the frequency e) that can be passed by the band-pass filter 102.

If it is determined, in step S105, that the frequencies of the image-blur signals have been passed through the band-pass filter 102, the integrating processor 55 adds, in step S106, the sum of a value (feedback amplitude A) determined by integrating image-blur signals in the previous sampling period and a feedback coefficient K determined from the coefficient table (see FIG. 4) to the adjusted image-blur signals, thereby determining the amount of control of the image-blur correction required for correcting image-blur. Thus, the image-blur correction is controlled, in the subsequent processing, such that normal image-blur correction is performed with respect to signals at frequencies within the middle frequency band E2.

If it is not determined, in step S105, that the frequencies of the image-blur signals have been passed through the band-pass filter 102, the microcomputer 91 determines, in step S107, whether or not the frequencies of the image-blur signals have been passed through the band-pass filter 103. That is, it is determined whether or not the frequencies of the image-blur signals fall within the frequency band (the highest frequency band E3 ranging from the frequency d to the frequency f) that can be passed by the band-pass filter 103.

If it is determined, in step S107, that the frequencies of the image-blur signals have been passed through the band-pass filter 103, the integrating processor 55 adds, in step S108, the sum of a value (feedback amplitude A) determined by integrating image-blur signals in the previous sampling period and a feedback coefficient K close to 1 to the adjusted image-blur signals, thereby determining the amount of control of the image-blur correction required for correcting image-blur. Thus, the image-blur correction is controlled, in the subsequent processing, such that the effect of image-blur correction with respect to signals at frequencies within the highest frequency band E3 can be intensified.

If it is not determined, in step S107, that the frequencies of the image-blur signals have been passed through the band-pass filter 103, no processing is performed since the frequencies of the image-blur signals are blocked by all of the band-pass filters 101 to 103.

In step S109, the modulator 56 converts the amount of control of image-blur correction determined, in the above-described processing, corresponding to each frequency band into pulse width modulation (PWM) signals and outputs them to the correction controller 16.

On the other hand, if it is determined, in step S82, that the fill-light projection flag is OFF, the band-pass filters 101 to 103 allow signals in respective predetermined frequency bands to pass through and output them to the sensitivity adjuster 53 in step S84.

In step S85, the microcomputer 13, with respect to the signals passed through any of the band-pass filters 101 to 103, performs a normal computation of the amount of correction control. This computation of the amount of correction control is the same as that performed in step S26 in FIG. 6 (that is, in FIG. 7). While the description will be omitted to avoid repetition, this processing determines the amount of control of the image-blur correction required for correcting image blur.

After the amount of control of the image-blur correction required for correcting image blur is determined in the processing in step S83 or S85, the correction controller 16 controls, in step S86, the correction of the blur corrector 17, based on the determined amount of control of the image-blur correction, such that the blur corrector 17 is positioned at a target position.

As described above, since the amount of control of image-blur correction corresponding to each frequency band can be determined, image-blur correction can be made such that the effect of correction to image blur at high frequencies can be intensified, or, at the time of fill-light projection, the effect of correction to image blur at low frequencies can be weakened, such correction being a major cause of the movement of the projection pattern into and out of the detection frame defining a contrast detection range for the autofocus function. In this case, other controls, such as exposure control and color control, are performed more effectively, compared to the case where no image-blur correction is performed.

Although three band-pass filters are arranged in parallel in the above description, the number of band-pass filters is not limited to three. Any number of band-pass filters required to separate the frequency bands may be arranged in parallel.

As described above, the image-blur correcting function is controlled such that, at the time of fill-light projection, no correction to image blur at low frequencies is performed, such correction being a major cause of the movement of the projection pattern into and out of the detection frame defining a contrast detection range for the autofocus function. However, the control of the image-blur correcting function is still accompanied by noise or vibration in this method, while their levels are lower compared to the case where the operation of stopping the image-blur correcting function is performed. Moreover, since image-blur correction is made to image blur at high frequencies in this case, the fill-light projection pattern may shift out of the detection frame at high frequencies. Other image-blur correcting function performed to cope with the above-described problems will now be described.

Figure 12:
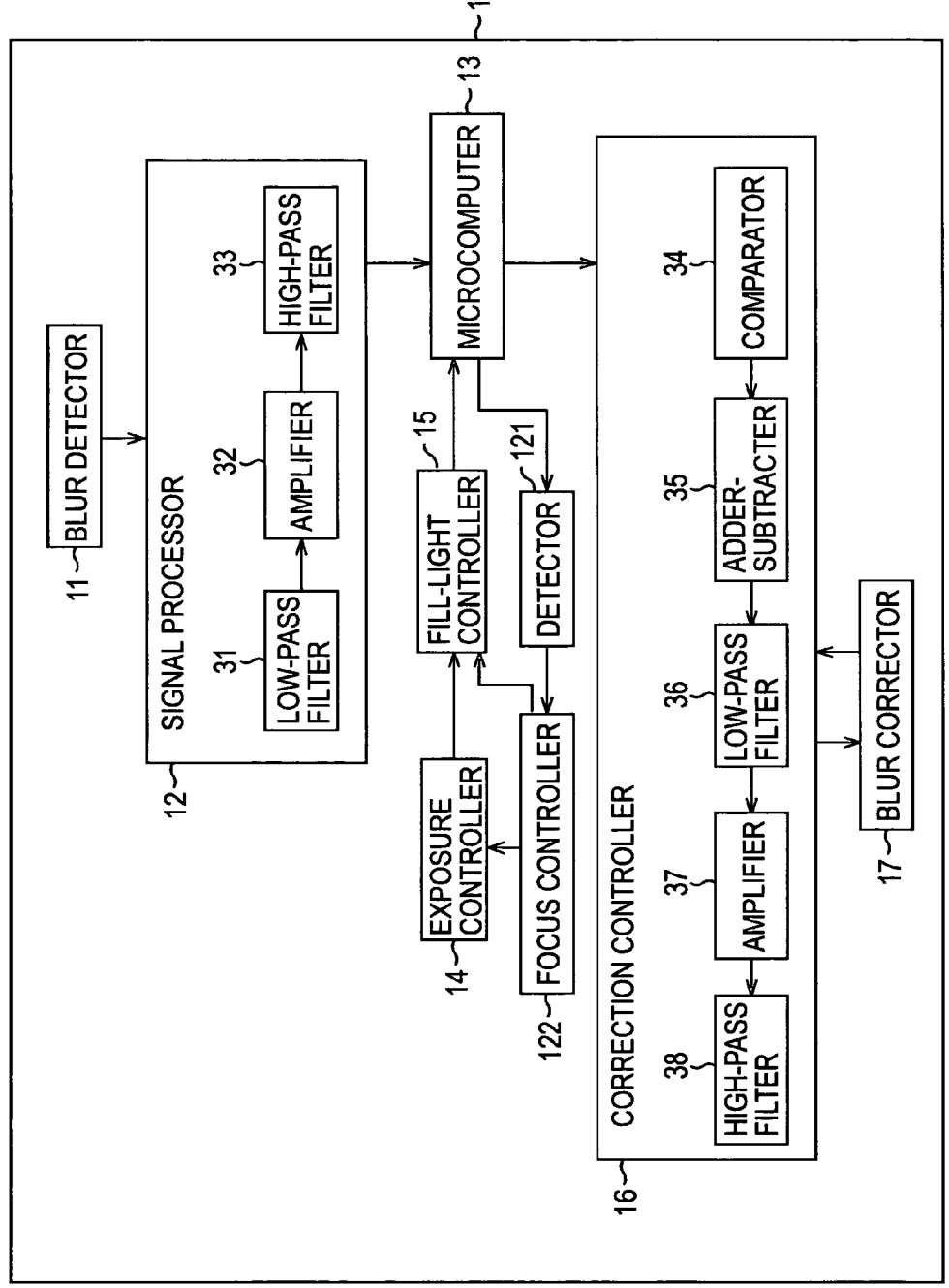
FIG. 12 is a block diagram showing another example of the structure of the image-capturing apparatus in FIG. 1.

FIG. 12 is a block diagram showing an example of another structure of the image-capturing apparatus 1 to which the present invention is applied. In FIG. 12, components corresponding to those in FIG. 1 are indicated by the same reference numerals and the description will be omitted to avoid repetition. Referring to FIG. 12, an image-capturing apparatus 1 includes a detector 121 and a focus controller 122, as well as a blur detector 11, a signal processor 12, a microcomputer 13, an exposure controller 14, a fill-light controller 15, a correction controller 16, and a blur corrector 17.

The detector 121 determines the position (coordinates) of a detection frame based on the amount of control of image-blur correction determined by the microcomputer 13, determines the size or number of detection frames based on information on the zoom factor, controls the position, controls the size or number of detection frames based on the determined values, and performs detection for autofocus within the detection frame. This detection frame is a contrast detection range used, in autofocus, to detect the contrast of images based on light from a subject.

The focus controller 122 performs autofocus based on the information detected by the detector 121, and outputs the information indicating the completion of autofocus to the fill-light controller 15.

Figure 13:
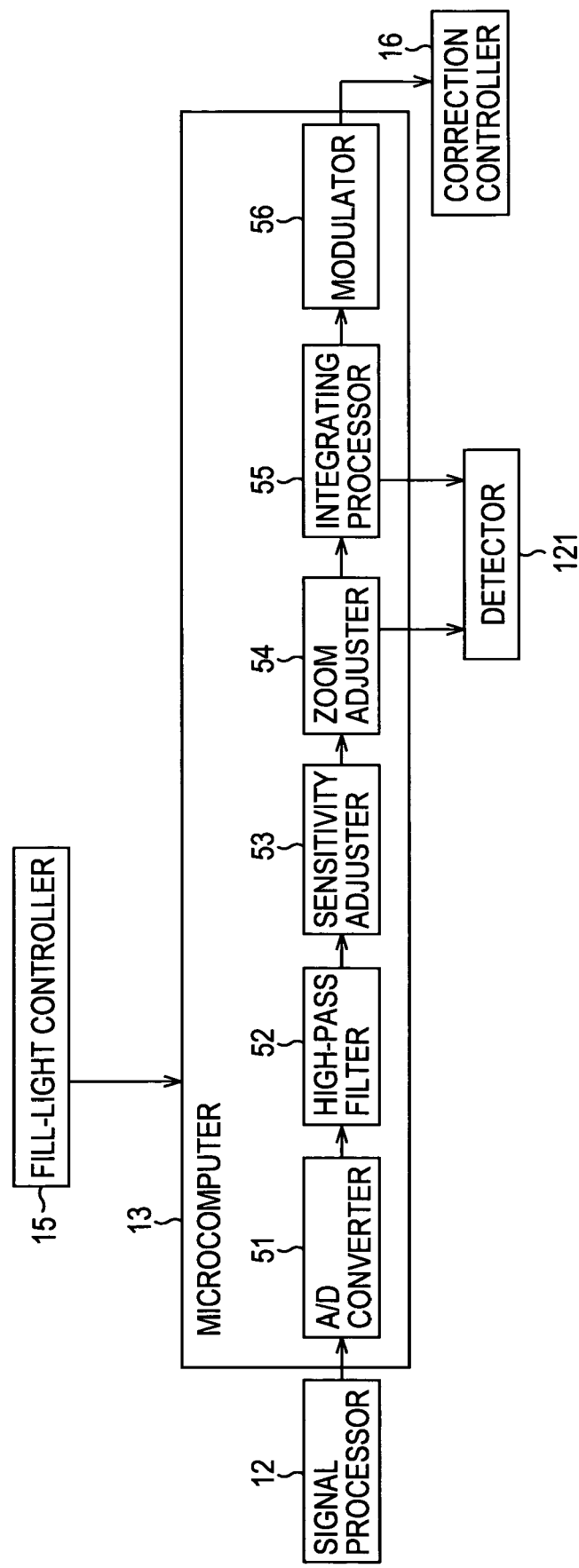
FIG. 13 is a block diagram showing an example of the structure of a microcomputer in FIG. 12.

FIG. 13 is a block diagram showing an example of the detailed structure of the microcomputer 13. In FIG. 13, components corresponding to those in FIG. 2 are indicated by the same reference numerals and the description will be omitted to avoid repetition.

The microcomputer 13 includes an analog-to-digital (A/D) converter 51, a high-pass filter 52, a sensitivity adjuster 53, a zoom adjuster 54, an integrating processor 55, and a modulator 56 and controls the entire operation of the image-capturing apparatus 1.

The A/D converter 51 converts image-blur signals, which are analog signals, from the signal processor 12 into digital signals and outputs them to the high-pass filter 52. The high-pass filter 52 blocks frequencies lower than a predetermined cutoff frequency.

To compensate for variation in sensitivity of an angular-velocity sensor included in the blur detector 11, the sensitivity adjuster 53 detects the sensitivity of the angular-velocity sensor and performs gain adjustment of the image-blur signals from the high-pass filter 52, according to the sensitivity of the angular-velocity sensor. Then, the zoom adjuster 54 detects the zoom factor and performs gain adjustment of the image-blur signals according to the zoom factor. Furthermore, the zoom adjuster 54 outputs the detected zoom factor to the detector 121.

The integrating processor 55 integrates the image-blur signals after the sensitivity adjustment and the gain adjustment, determines the amount of image-blur correction control corresponding to the image-blur signals and required for correcting image blur, and outputs the determined amount of control to the detector 121 or the modulator 56. The modulator 56 converts the determined amount of control into pulse width modulation (PWM) signals and outputs them to the correction controller 16.

Figure 14:
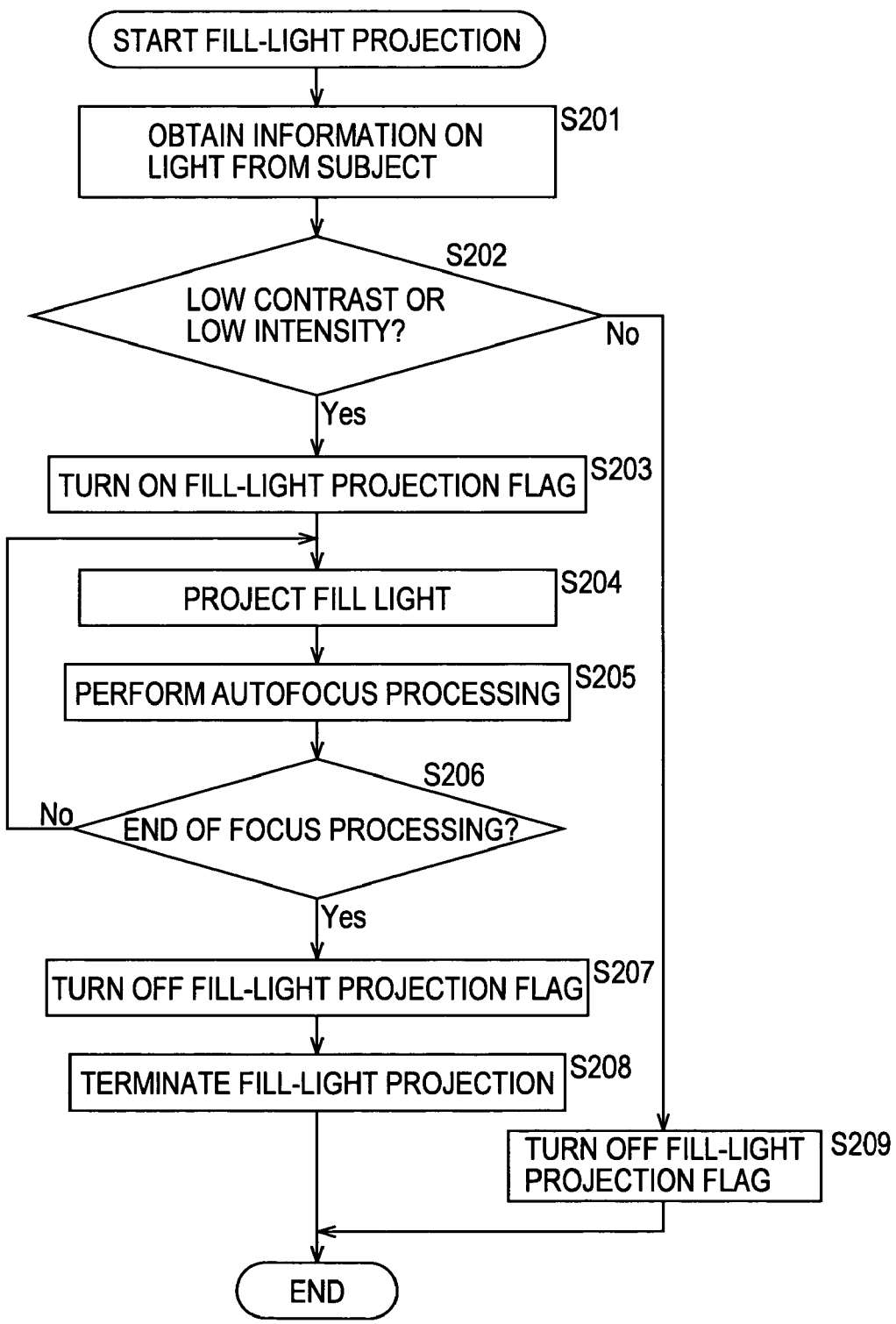
FIG. 14 is a flowchart showing fill-light projection processing in the image-capturing apparatus in FIG. 12.

Processing of fill-light projection in autofocus will now be described with reference to the flowchart in FIG. 14.

After the power is turned on, the processing of fill-light projection is performed in the image-capturing apparatus 1. In step S201, the fill-light controller 15 obtains measured information on light from a subject, from the exposure controller 14.

In step S202, the fill-light controller 15 determines, based on the information on light from the subject, whether or not the light is low contrast or low intensity. If it is determined that the light is low contrast or low intensity, the fill-light controller 15 turns ON the fill-light projection flag in step S203.

In step S204, the fill-light controller 15 controls the fill-light projector (not shown) including the light to project a fill-light projection pattern. Thus, in step S205, the detector 121 and the focus controller 122 perform autofocus processing at the time of fill-light projection.

This autofocus processing is performed by the detector 121, which detects the contrast of an image based on light from the subject, within a detection range defined based on the amount of control of image-blur correction, and by the focus controller 122, which corrects an optical lens to maximize the contrast. The position, and the size or number of the detection frames are determined, in image-blur correction processing described below with reference to the flowchart in FIG. 15, by the detector 121, based on the amount of image-blur correction control supplied from the integrating processor 55.

On completion of the autofocus processing in step S205, the focus controller 122 outputs information indicating the completion of the autofocus processing to the fill-light controller 15. In response, in step S206, the fill-light controller 15 determines whether or not the autofocus processing has been completed. If it is not determined that the autofocus processing has been completed, the process returns to step S204 and repeats the subsequent processing.

If it is determined in step S206 that the autofocus processing has been completed, the fill-light controller 15 turns OFF the fill-light projection flag in step S207 and terminates the projection of the fill-light projection pattern in step S208.

In step S202, if it is not determined that the light is low contrast or low intensity, the fill-light controller 15 turns OFF the fill-light projection flag and terminates the processing in step S209.

The microcomputer 13 can determine, by monitoring the ON/OFF state of the fill-light projection flag in the fill-light controller 15, whether or not the fill-light projection pattern is projected in image-blur correction processing described below.

The image-blur correction processing will now be described with reference to the flowchart in FIG. 15.

In step S221, the A/D converter 51 converts the image-blur signals, which are analog signals, into digital signals.

Figure 16:
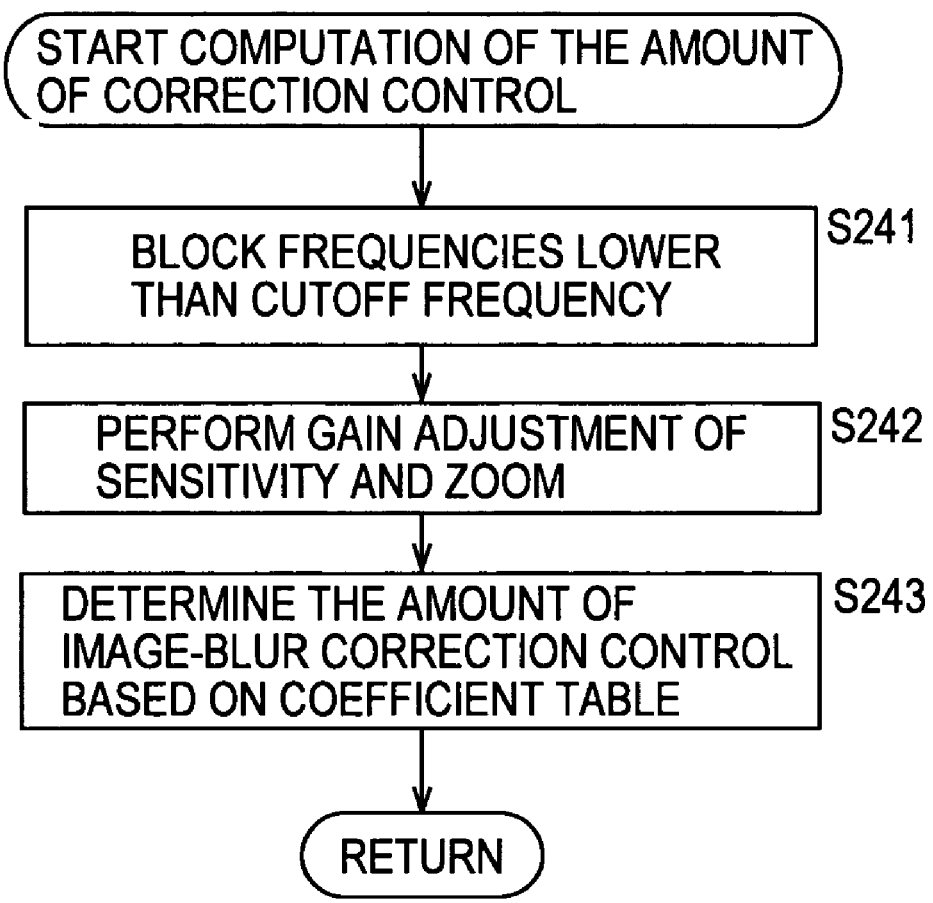
FIG. 16 is a flowchart showing computations of the amount of control of image-blur correction in step S223 in FIG. 15.

In step S222, the microcomputer 13 monitors the fill-light controller 15 and determines whether or not the fill-light projection flag is ON. If it is determined that the fill-light projection flag is ON, the microcomputer 13 performs a computation of the amount of control of image-blur correction in step S223. The computation of the amount of control of image-blur correction will now be described with reference to the flowchart in FIG. 16.

In step S241, the high-pass filter 52 blocks image-blur signals at frequencies lower than a predetermined cutoff frequency.

In step S242, the sensitivity adjuster 53 detects the sensitivity of the angular-velocity sensor included in the blur detector 11 and performs gain adjustment of the image-blur signals according to the sensitivity of the angular-velocity sensor. The zoom adjuster 54 detects a zoom factor and performs gain adjustment of the image-blur signals according to the zoom factor.

In step S243, the integrating processor 55 adds the sum of a value (feedback amplitude A) determined by integrating image-blur signals in the previous sampling period and a feedback coefficient K determined from the coefficient table (see FIG. 4) to the adjusted image-blur signals, thereby determining the amount of control of the image-blur correction required for correcting image blur.

Figure 15:
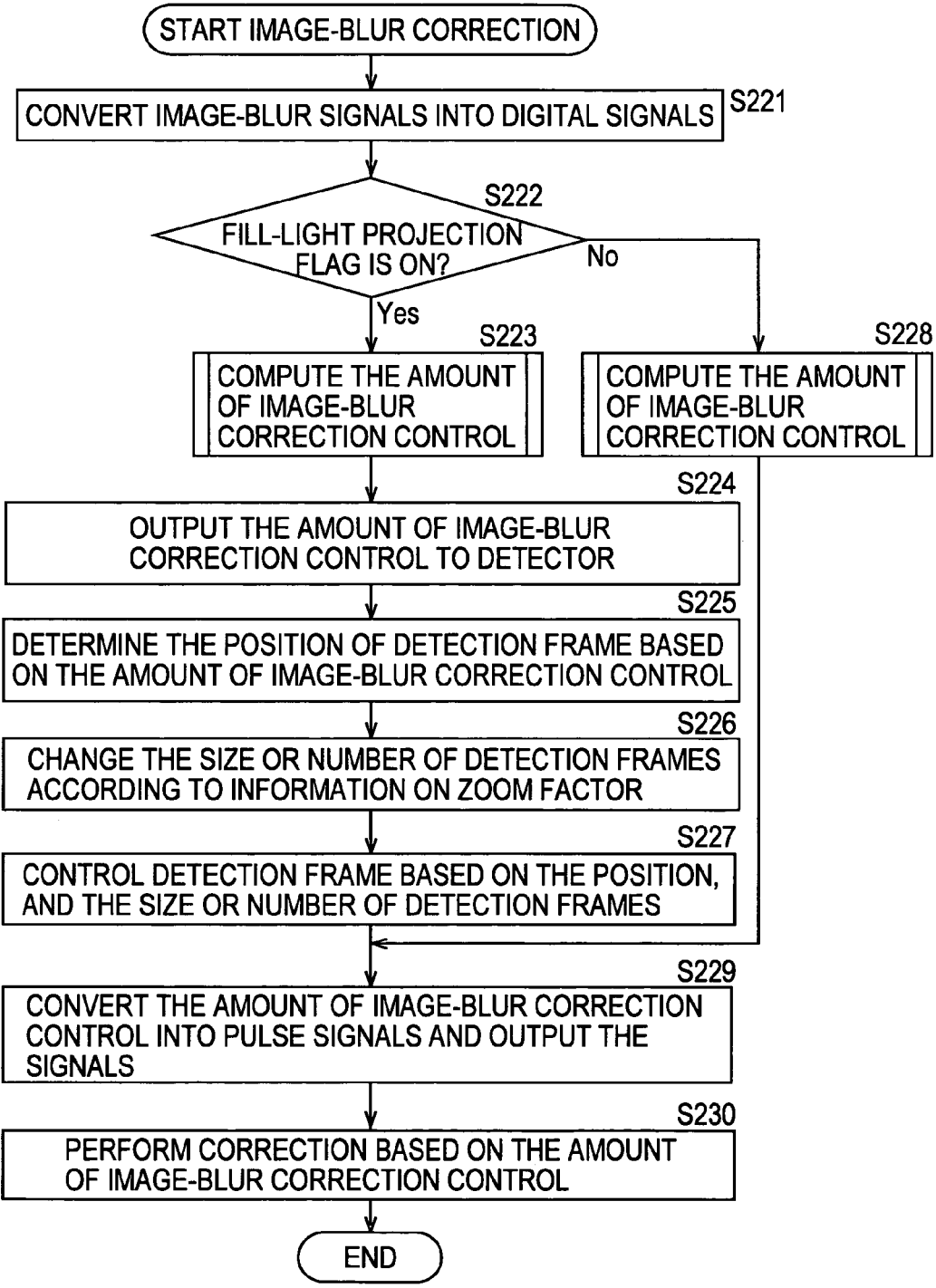
FIG. 15 is a flowchart showing image-blur correction processing in the image-capturing apparatus in FIG. 12.

Since the amount of control of image-blur correction is determined as described above, the integrating processor 55 outputs the determined amount of control of image-blur correction to the detector 121 in step S224 in FIG. 15, while the zoom adjuster 54 outputs the information on the zoom factor to the detector 121.

In step S225, the detector 121 determines the position of the detection frame, based on the amount of control of image-blur correction from the integrating processor 55, such that the detection frame moves in the direction canceling the image-blur correction. In step S226, the detector 121 changes the size or number of detection frames based on the information on the zoom factor supplied from the zoom adjuster 54. This processing for changing the size or number of detection frames is performed to reduce the probability that the fill-light projection pattern moves in and out of the detection frame, or that the fill-light projection pattern is off the detection frame.

In step S227, the detector 121 controls the detection frame based on the position of the detection frame determined in step S225, and on the size or number of detection frames determined in step S226. Since the image contrast of the projection pattern is detected (the above-described autofocus processing in step S205 in FIG. 14) within the detection frame controlled as described above, based on the amount of control of image-blur correction, the movement of the fill-light projection pattern into and out of the detection frame can be prevented at the time of image-blur correction. The accuracy of the autofocus function is thus improved.

On the other hand, if it is determined, in step S222, that the fill-light projection flag is OFF, the microcomputer 13 performs a computation of the amount of control of image-blur correction in step S228. This computation of the amount of correction control is the same as that performed in step S223 (that is, in FIG. 16). While the description will be omitted to avoid repetition, this processing determines the amount of control of the image-blur correction required for correcting image blur.

Then, in step S229, the modulator 56 converts the amount of the image-blur correction control, determined by the integrating processor 55 in step S223 or in S228, into pulse width modulation (PWM) signals and outputs them to the correction controller 16.

In step S230, the correction controller 16 controls the correction of the blur corrector 17, based on the determined amount of control of the image-blur correction, such that the blur corrector 17 is positioned at a target position.

At the time of fill-light projection, as described above, the position of the detection frame defining a contrast detection range for the autofocus function is controlled based on the amount of control of image-blur correction. Thus, at the time of detection, the movement of the projection pattern into and out of the detection frame can be prevented and the accuracy of the autofocus function can be improved. Moreover, processing for changing the size or number of detection frames makes the fill-light projection pattern to more easily enter the detection frame regardless of the zoom factor.

The processing for changing the size or number of the detection frames is particularly effective in the case where the amount of control of image-blur correction is too large, for the control of the detection frame alone, to reduce the probability that the fill-light projection pattern moves in and out of the detection frame, or that the fill-light projection pattern is off the detection frame.

Furthermore, since the image-blur correction can be performed at the time of fill-light projection, normal autofocus of a subject can be performed with light other than the fill-light projection pattern. The autofocus function can also be effectively performed on a subject unsuitable for the fill light (that is, for example, a subject absorbing the fill light, allowing the fill light to pass through, or placed in an area, such as the end of the screen, where no fill light reaches). Other controls, such as exposure control and color control, are also effectively performed.

Moreover, since no abrupt change of image-blur correction, such as stopping of the image-blur correcting function and changing of the method for controlling the correcting function, is made at the time of fill-light projection, the occurrence of noise, vibration, or an abrupt change of the screen can be prevented. Furthermore, since the image-blur correcting function always operates, a delay in image-blur correction can be prevented. In addition, cost reduction can be achieved since the existing image-capturing apparatus requires no additional apparatuses to realize the above-described effects.

Furthermore, in an image-capturing apparatus with a fill-light projector incorporating a light source having a high energy density, such as laser light, the applicability of the apparatus is improved since no change that involves risk, such as a change in projection pattern, is required in the case of replacing the existing lens with a lens having a different zoom factor.

Figure 17:
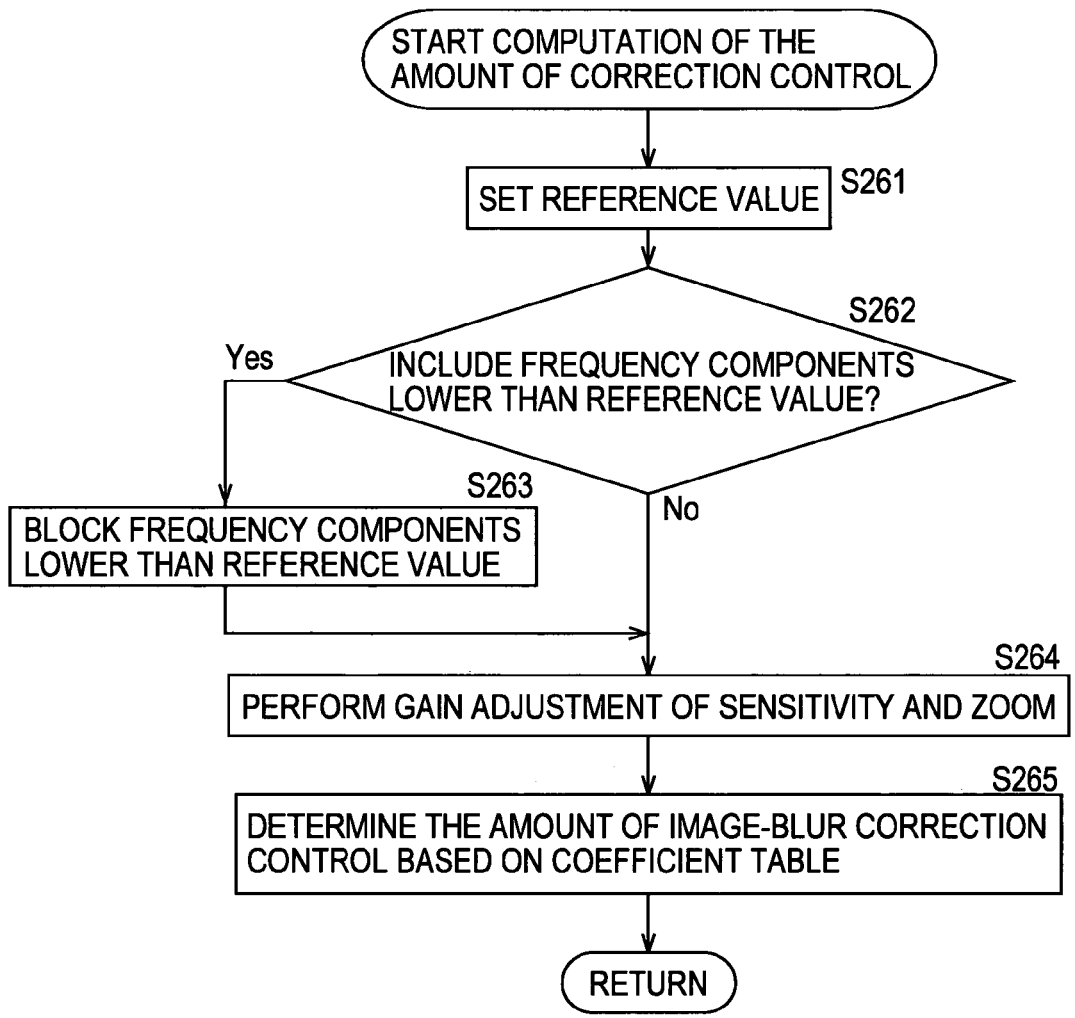
FIG. 17 is a flowchart showing another example of computations of the amount of control of image-blur correction in step S223 in FIG. 15.

The flowchart in FIG. 17 shows an example of computations of the amount of image-blur correction control in the image-capturing apparatus 1 in FIG. 12, to which control processing of the image-blur correcting function for not performing correction to image-blur signals at low frequencies during fill-light projection performed in the image-capturing apparatus 1 in FIG. 1 is applied. This computation of the amount of image-blur correction control is another example of that performed in step S223 in the case where the microcomputer 13 determines, in step S222 in FIG. 15, that the fill-light projection flag is ON.

In step S261, the microcomputer 13 sets a reference value α for frequencies. This reference value α for frequencies is set higher than a cutoff frequency predetermined for the high-pass filter 52 to block low frequencies, in order that no image-blur correction to image blur at the low frequencies, which is a major cause of the movement of the projection pattern into and out of a detection frame defining a contrast detection range for an autofocus function, is performed.

In step S262, the microcomputer 13 determines whether or not the image-blur signals include frequency components lower than the reference value a set in step S261. If it is determined, in step S262, that the image-blur signals include frequency components lower than the reference value a, the high-pass filter 52 blocks the frequency components lower than the reference value α of the image-blur signals, in step S263. This prohibits a computation of the amount of control of image-blur correction to image-blur signals at frequencies lower than the reference value α.

If it is determined in step S262 that the image-blur signals include no frequency component lower than the reference value α, the microcomputer 13 skips processing in step S263 and performs a computation of the amount of correction control, in step S264. That is, in processing subsequent to step S264, only computation of the amount of control of the image-blur correction to image-blur signals at frequencies higher than the reference value α is performed.

In step S264, the sensitivity adjuster 53 performs gain adjustment of the image-blur signals according to the angular-velocity sensor included in the blur detector 11, while the zoom adjuster 54 performs gain adjustment of the image-blur signals according to the zoom position.

In step S265, the integrating processor 55 adds the sum of a value (feedback amplitude A) determined by integrating image-blur signals in the previous sampling period and a feedback coefficient K determined from the coefficient table (see FIG. 4) to the adjusted image-blur signals, thereby determining the amount of control of the image-blur correction required for correcting image blur.

In processing subsequent to step S224 in FIG. 15, the position of the detection frame, which is a contrast detection range for the autofocus function, and the image-blur correction are controlled, based on the amount of control of image-blur correction, the amount being determined as described above. That is, since a computation of the amount of control of image-blur correction at low frequencies is prohibited, the subsequent control of the detection frame and the image-blur correction are performed based on the amount of control of image-blur correction determined by a computation of the amount of control of image-blur correction at other frequencies (high frequencies).

As described above, correction to image blur at low frequencies and to image blur due to hand movements with high amplitude, which probably cause deviation of the projection pattern from the detection frame or movement of the projection pattern into and out of the detection frame, are restricted, while the detection frame is controlled. Thus, a large amount of correction control that cannot be achieved only by controlling the detection frame, for example, in the case where the fill-light projection pattern goes beyond the detection frame, is not performed. Thus, the movement of the fill-light projection pattern into and out of the detection frame can be more effectively prevented, and the accuracy of the autofocus function is improved.

Although the angular-velocity sensor and angular-velocity signals have been used to describe the blur detector 11 and image-blur signals, respectively, other angular sensors, angular-velocity sensors, or velocity sensors may also be employed. Moreover, although the antivibration shiftable lens is used to describe the blur corrector 17, a vari-angle prism (VAP) or the like may also be employed.

Although the detection frame for the autofocus function has been described above, detection frames for functions other than the autofocus function may also be controlled such that the amount of control of image-blur correction is cancelled.

Although the above description has focused on camcorders, the present invention is also applicable to digital still cameras and other apparatuses for capturing moving images and still images.

Although the series of processing operations described above can be executed by hardware, it can also be executed by software. In this case, for example, the image-capturing apparatus 1 in FIG. 1 and FIG. 12 is replaced with an image-capturing apparatus 201, as shown in FIG. 18.

Figure 18:
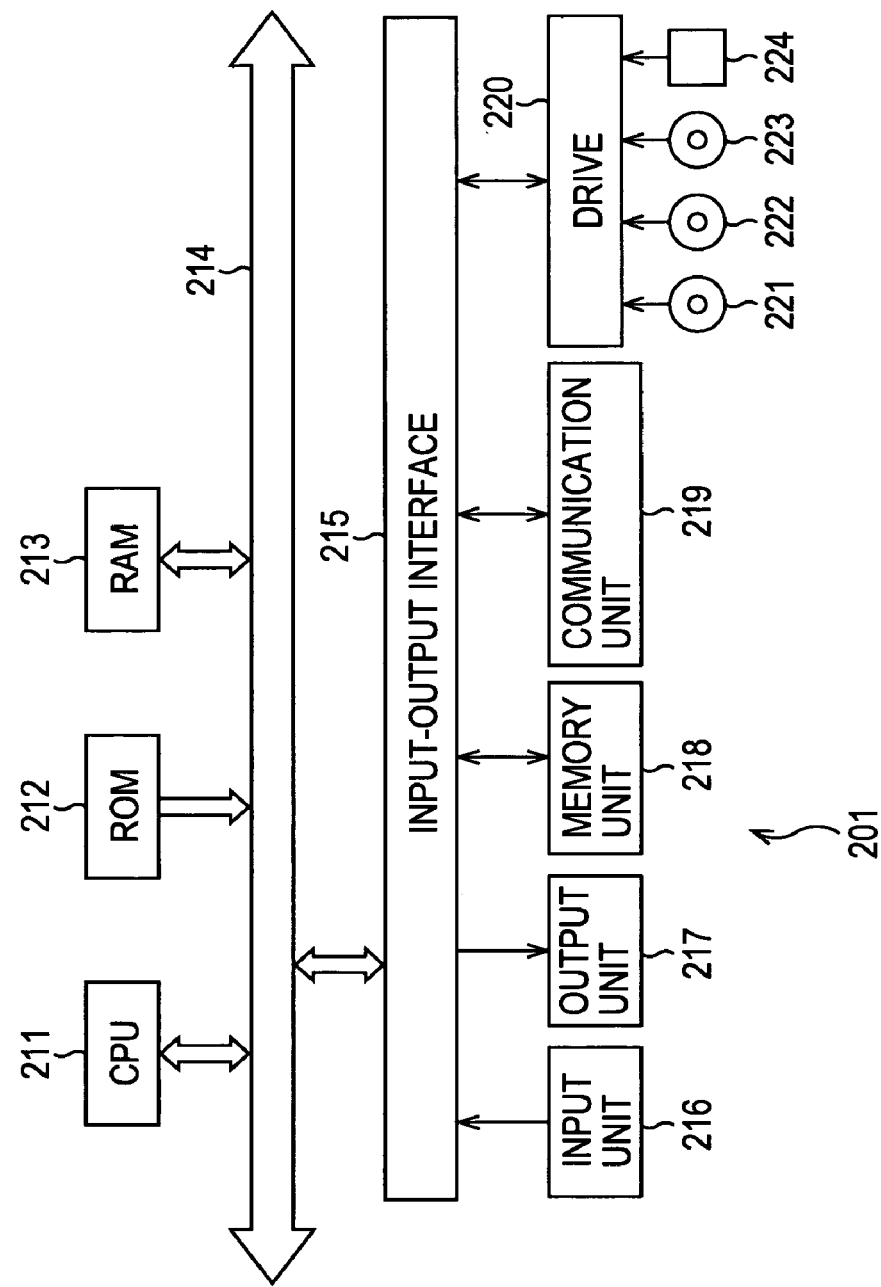
FIG. 18 is a block diagram showing another example of the structure of the image-capturing apparatus in FIG. 1.

Referring to FIG. 18, a central processing unit (CPU) 211 performs various processing according to a program stored in a read only memory (ROM) 212, or a program loaded from a memory unit 218 to a random access memory (RAM) 213. Data, and the like, required for the CPU 211 to perform various processing is stored in the RAM 213 as necessary.

The CPU 211, the ROM 212, and the RAM 213 are connected with one another via a bus 214. An input-output interface 215 is also connected to the bus 214.

An input unit 216 including a keyboard and a mouse; an output unit 217 including a display, such as a cathode ray tube (CRT) and a liquid crystal display (LCD), and a speaker; the memory unit 218 including a hard disk; and a communication unit 219 including a modem and a terminal adapter are connected to the input-output interface 215. The communication unit 219 performs communication processing via a network, which is not shown.

A drive 220 is connected to the input-output interface 215, as necessary, and is provided with, for example, a magnetic disk 221, an optical disk 222, a magneto-optical disk 223, and a semiconductor memory 224, as necessary, and computer programs read out therefrom are installed in the memory unit 218, as necessary.

To execute a series of processing operations by software, programs included in the software are installed from a network or a recording medium into a computer incorporated in dedicated hardware or, for example, into a general-purpose personal computer that can perform various functions by installation of various programs.

The recording medium not only includes a packaged medium distributed separately from the main body of the apparatus, as shown in FIG. 18, so as to provide users with programs, and including, for example, the magnetic disk 221 (including flexible disk), the optical disk 222 (including compact-disk read-only memory (CD-ROM) and digital versatile disk (DVD)), the magneto-optical disk 223 (including Mini-Disc (registered trademark) (MD)), and the semiconductor memory 224, in which programs are recorded, but also includes the ROM 212 and a hard disk included in the memory unit 218, in which programs are recorded, and which are preinstalled and provided together with the main body of the apparatus to users.

In the present description, steps of describing programs to be recorded in the recording medium not only include processing performed in chronological order according to a described order, but also include processing not necessarily performed in chronological order but performed simultaneously or individually.

In the present description, system refers to the entire apparatus including a plurality of units.

INDUSTRIAL APPLICABILITY

As described above, according to the present invention, the accuracy improvement of the autofocus function is enhanced. Moreover, according to the present invention, degradation of the accuracy of control, such as color control and exposure control, can be prevented. Furthermore, according to the present invention, a fill-light projection pattern can easily fall within the detection frame regardless of the zoom factor. According to the present invention, power saving and cost reduction can be achieved.

The invention claimed is:

1. An image-capturing apparatus comprising sensing means detecting signals of image blur; correcting means correcting the image blur; projecting means projecting a projection pattern for focus processing toward a subject to be captured; and detecting means detecting the projection pattern within a detection frame, the projection pattern has been projected by the projecting means;

the image-capturing apparatus comprising:
  first determining means determining whether or not the projection pattern is projected by the projecting means;
  computing means computing, if the first determining means determines that the projection pattern is projected, the amount of image-blur correction control corresponding to the signals, based on a coefficient corresponding to the amplitude of the signals detected by the sensing means;
  frame-setting means setting, based on the amount of image-blur correction control computed by the computing means, the position of the detection frame within which the projection pattern is detected by the detecting means; and
  correction-control means controlling, based on the amount of image-blur correction control computed by the computing means, the correction of the image blur performed by the correcting means.

2. The image-capturing apparatus according to claim 1, further comprising:
  changing means changing the size of the detection frame or number of detection frames based on information on a zoom factor, as soon as the position of the detection frame is set by the frame-setting means.

3. The image-capturing apparatus according to claim 1, further comprising:
reference-value setting means setting a reference value;
second determining means determining, if the first determining means determines that the projection pattern is projected, whether or not the frequency of the signals detected by the sensing means is lower than the reference value set by the reference-value setting means; and
prohibiting means prohibiting the image-blur correction by the correcting means if the second determining means determines that the frequency of the signals is lower than the reference value.

4. The image-capturing apparatus according to claim 3, wherein the computing means computes, if the second determining means determines that the frequency of the signals is higher than the reference value, the amount of image-blur correction control corresponding to the signals, based on a coefficient corresponding to the amplitude of the signals.

5. The image-capturing apparatus according to claim 4, wherein the computing means computes, if the second determining means determines that the frequency of the signals is higher than the reference value, the amount of image-blur correction control corresponding to the signals, while bringing the coefficient close to 1.

6. The image-capturing apparatus according to claim 1, further comprising:
dividing means dividing, when the first determining means determines that the projection pattern is projected, the signals into a plurality of frequency bands, based on the frequency of the signals detected by the sensing means; and
frequency-specific computing means computing the amount of image-blur correction control corresponding to the signals divided into the plurality of frequency bands by the dividing means, for each of the frequency bands, based on the coefficient corresponding to the amplitude of the signals;
wherein the correction-control means controls, based on the amount of control computed by the frequency-specific computing means, the correction of the image blur performed by the correcting means.

7. The image-capturing apparatus according to claim 6, wherein the dividing means divides the signals into three frequency bands; the frequency-specific computing means computes the amount of image-blur correction control corresponding to the signals, which are divided by the dividing means, in the lowest frequency band, while bringing the coefficient close to 0;
computes the amount of image-blur correction control corresponding to the signals, which are divided by the dividing means, in the middle frequency band, based on the coefficient corresponding to the amplitude of the signals; and
computes the amount of image-blur correction control corresponding to the signals, which are divided by the dividing means, in the highest frequency band, while bringing the coefficient close to 1.

8. A method for processing signals in an image-capturing apparatus comprising sensing means detecting signals of image blur; correcting means correcting the image blur; projecting means projecting a projection pattern for focus processing toward a subject to be captured; and detecting means detecting the projection pattern within a detection frame, the projection pattern has been projected by the projecting means; the method comprising:
a determining step for determining whether or not the projection pattern is projected by the projecting means;
a computing step for computing, if it is determined in the determining step that the projection pattern is projected, the amount of image-blur correction control corresponding to the signals, based on a coefficient corresponding to the amplitude of the signals detected by the sensing means;
a frame-setting step for setting, based on the amount of image-blur correction control computed in the computing step, the position of the detection frame within which the projection pattern is detected by the detecting means; and
a correction-control step for controlling, based on the amount of image-blur correction control computed in the computing step, the correction of the image blur performed by the correcting means.

9. A recording medium for recording a computer-readable program for an image-capturing apparatus comprising sensing means detecting signals of image blur; correcting means correcting the image blur; projecting means projecting a projection pattern for focus processing toward a subject to be captured; and detecting means detecting the projection pattern within a detection frame, the projection pattern being projected by the projecting means; the computer-readable program comprising:
a determining step for determining whether or not the projection pattern is projected by the projecting means;
a computing step for computing, if it is determined in the determining step that the projection pattern is projected, the amount of image-blur correction control corresponding to the signals, based on a coefficient corresponding to the amplitude of the signals detected by the sensing means;
a frame-setting step for setting, based on the amount of image-blur correction control computed in the computing step, the position of the detection frame within which the projection pattern is detected by the detecting means; and
a correction-control step for controlling, based on the amount of image-blur correction control computed in the computing step, the correction of the image blur performed by the correcting means.

* * * * *

UNITED STATES PATENT AND TRADEMARK OFFICE
CERTIFICATE OF CORRECTION

PATENT NO. : 7,636,107 B2
APPLICATION NO. : 10/516270
DATED : December 22, 2009
INVENTOR(S) : Kumaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1207 days.

Signed and Sealed this

Ninth Day of November, 2010

David J. Kappos
*Director of the United States Patent and Trademark Office*